United States Patent [19]

Schmitt et al.

[11] Patent Number: 5,412,035
[45] Date of Patent: May 2, 1995

[54] PRESSURE-SENSITIVE ADHESIVES

[75] Inventors: Edward E. Schmitt, Palo Alto; Raymond Clarke, Los Altos; Andrew W. Larson, Palo Alto; Steven P. Bitler, Menlo Park; Ross S. Tsugita, Mountain View; Donald A. Schultz, San Mateo, all of Calif.

[73] Assignee: Landec Corporation, Menlo Park, Calif.

[21] Appl. No.: 928,800

[22] Filed: Aug. 12, 1992

Related U.S. Application Data

[63] Continuation-in-part of Ser. No. 829,494, Feb. 7, 1992, abandoned, which is a continuation-in-part of Ser. No. 654,723, Feb. 12, 1991, abandoned.

[51] Int. Cl.$^6$ .................... C08L 53/00; B32B 7/12; A61F 13/02
[52] U.S. Cl. ..................... 525/93; 424/448; 428/40; 428/200; 428/352; 428/355; 525/88; 525/95; 525/98; 525/222; 525/236; 525/242
[58] Field of Search ............ 525/228, 221, 277, 275, 525/88, 93, 95, 98, 222, 236, 242; 428/187, 40, 200, 352, 355; 424/448

[56] References Cited

U.S. PATENT DOCUMENTS

| | | |
|---|---|---|
| 2,990,311 | 6/1961 | Shepherd ................ 154/95 |
| 3,242,051 | 3/1962 | Hiestand et al. . |
| 3,284,423 | 11/1966 | Knapp . |
| 3,299,010 | 1/1967 | Samour . |
| 3,535,195 | 10/1970 | Davis et al. . |
| 3,635,754 | 1/1972 | Beede . |
| 3,644,252 | 2/1972 | Shenfeld et al. ............ 524/522 |
| 3,690,937 | 9/1972 | Guse et al. . |
| 3,838,079 | 9/1974 | Kosaka et al. . |
| 3,922,464 | 11/1975 | Silver et al. . |
| 3,935,338 | 1/1976 | Robertson . |
| 3,956,223 | 5/1976 | Chiang et al. . |
| 3,967,045 | 6/1976 | Kurobe et al. ............ 428/463 |
| 3,975,323 | 8/1976 | Georgoudis et al. . |
| 4,033,918 | 7/1977 | Hauber ................ 524/296 |
| 4,039,705 | 8/1977 | Douek et al. ............ 428/40 |
| 4,082,705 | 4/1978 | Beede et al. ............ 525/213 |
| 4,139,675 | 2/1979 | Nagai et al. . |
| 4,140,115 | 2/1979 | Schonfeld . |

(List continued on next page.)

FOREIGN PATENT DOCUMENTS

| | | |
|---|---|---|
| 062682 | 10/1981 | European Pat. Off. . |
| 0107915 | 9/1983 | European Pat. Off. . |
| 0119699 | 1/1984 | European Pat. Off. . |
| 0147119 | 12/1984 | European Pat. Off. . |
| 60-177085 | 2/1984 | Japan . |
| 63-202682 | 8/1988 | Japan . |
| 870022 | 6/1959 | United Kingdom . |
| 2097410 | 4/1982 | United Kingdom . |
| 2223023 | 8/1989 | United Kingdom . |
| WO8403837 | 11/1984 | WIPO . |
| WO86/05503 | 3/1986 | WIPO . |
| 9100496 | 1/1991 | WIPO . |
| WO9114461 | 10/1991 | WIPO . |
| WO9114462 | 10/1991 | WIPO . |

OTHER PUBLICATIONS

S. C. Temin, *Encyclopedia of Polymer Science and Engineering*, vol. 13 (New York, John Wiley & Son, 1988), pp. 345–368.

(List continued on next page.)

Primary Examiner—John Kight, III
Assistant Examiner—Shelley A. Dodson
Attorney, Agent, or Firm—Jeffrey G. Sheldon; Sheldon & Mak, Inc.

[57] ABSTRACT

Pressure-sensitive adhesive (PSA) compositions containing a crystalline polymeric additive having an $M_w$ of less than 25,000 and a melting point ($T_a$) greater than 23° C., preferably 30° to 60°, and PSA composites of a backing, preferably a flexible backing, with such a PSA composition coated thereon. The presence of the additive causes the PSA to lose adhesive strength when heated to $T_a$. The base resin of the PSA is preferably a polyacrylate or a styrene/butadiene copolymer. The additive, which is preferably present in amount 1 to 35%, e.g. 5 to 30%, is preferably a side chain crystallizable (SCC) polymer.

98 Claims, 2 Drawing Sheets

U.S. PATENT DOCUMENTS

| | | |
|---|---|---|
| 4,143,858 | 3/1979 | Schmidt, III et al. |
| 4,151,319 | 4/1979 | Sackoff et al. |
| 4,152,189 | 5/1979 | Guerin et al. |
| 4,186,258 | 1/1980 | Schmidt, III et al. |
| 4,335,026 | 6/1982 | Balinth |
| 4,338,227 | 7/1982 | Ballard ............................ 525/228 |
| 4,356,222 | 10/1982 | Harakawa |
| 4,361,526 | 11/1982 | Allen |
| 4,363,872 | 12/1982 | Ealding ............................ 430/532 |
| 4,400,486 | 8/1983 | Iwata et al. .................... 525/228 |
| 4,460,371 | 6/1984 | Abber |
| 4,487,872 | 12/1984 | Takemoto et al. |
| 4,557,964 | 12/1985 | Magnotta ........................ 428/187 |
| 4,564,010 | 1/1986 | Coughlan et al. |
| 4,693,776 | 9/1987 | Krampe et al. |
| 4,728,572 | 3/1988 | Davis |
| 4,732,808 | 3/1988 | Krampe et al. |
| 4,737,410 | 4/1988 | Kantner |
| 4,762,888 | 8/1988 | Sun et al. |
| 4,778,852 | 10/1988 | Futamura |
| 4,783,354 | 1/1988 | Fagan |
| 4,835,199 | 5/1989 | Futamura et al. |
| 4,879,178 | 11/1989 | Sun et al. |
| 4,925,908 | 5/1990 | Bernard |
| 4,973,615 | 11/1990 | Futamura et al. |
| 5,100,963 | 3/1992 | Lin ................................... 525/221 |
| 5,120,349 | 6/1992 | Stewart, et al. |

OTHER PUBLICATIONS

*Handbook of Pressure–Sensitive Adhesive Technology*, Ed. Don Satas (New York, Van Nostrand Reinhold Co., Inc., 1982), pp. 50–67.

A. H. Landrock, *Adhesives Technology Handbook* (Park Ridge, New Jersey, Noyes Publications, 1985), pp. 154–156.

T. Flanagan, "Hot–Melt Adhesives," *Handbook of Adhesive Bonding*, Ed. C. V. Cagle (New York, McGraw–Hill, 1982), pp. 8-1 to 8-17.

J. Polymer Sci.: Macromolecular Review, 8:117 (1974).
J. Ploymer Sci.: Polymer Chemistry Edition, 19:1871–1873 (1981).
Macromolecules 19:611 (1986).
J. Poly. Sci. Poly. Physics Ed. 18:2197 (1980).
J. Poly. Sci. U.S.S.R. 21:241 (1979).
J. Polymer Sci.: Macromolecular Review 8:117–252 (1974).
J. Poly. Sci. 9:3349 (1971).
J. Poly. Sci. 9:1835 (1971).
J. Am. Chem. Soc. 76:6280 (1954).
Macromolocules 13:12–15 (1980).
Macromolecules 13:15 (1980).
Macromolecules 12:94 (1979).
J. Am. Chem. Soc. 75:3326 (1953).
Macromolecules 18:2141 (1985).
Polymer 29(7):1233–1239 (1988).
J. Poly. Sci. 7:3053 (1969).
J. Poly. Sci. 10:3347 (1972).
J. Poly. Sci. 10:1655 (1972).
British Polymer J, 20:521–524 (1988).
Makromol. Chem. 190:1069–1078 (1989).
J. Poly. Sci. 60:169 (1962) (erroneously cited as 60:19).
Makromol. Chem. 191:603–614 (1990).
Makromol. Chem. 191:615–624 (1990).
Makromol. Chem. 191:2341–2354 (1990)
Makromol. Chem. 191:2355–2365 (1990).
Macromolecules 23:333–337 (1990).
Macromolecules 18(2):123–127 (1985) (erroneously cited as 18:213).
J. Poly. Sci. 9:3367 (1971).
J. Poly. Sci. 17:991 (1985).
J. Poly. Sci., Part A: Poly. Chem. 28(2):2393–2401 (1990).

PRESSURE-SENSITIVE ADHESIVES

CROSS-REFERENCE TO RELATED APPLICATIONS

This application is a continuation-in-part of commonly assigned application Ser. No. 07/829,494, filed Feb. 7, 1992 by Edward E. Schmitt and Ross Tsugita now abandoned, which is a continuation-in-part of commonly assigned application Ser. No. 07/654,723 filed, Feb. 12, 1991, by Edward E. Schmitt and Ross Tsugita now abandoned. The disclosure of each of those applications is incorporated herein by reference.

BACKGROUND OF THE INVENTION

1. Field of the Invention

This invention relates to pressure-sensitive adhesives.

2. Introduction to the Invention

Pressure-sensitive adhesives, which are often referred to as PSA's, are well known. They are viscoelastic materials which, in solvent-free form, remain permanently tacky and will adhere instantaneously to a wide variety of solid surfaces as a result of the application of very slight pressure. A PSA is usually used in the form of a solvent-free coating on a backing, often a flexible backing, for example a paper label or a polymeric tape. Such PSA-coated backings are referred to herein as PSA composites.

In some uses of PSA composites, it is desirable to remove the PSA composite from the receptor (i.e. the surface to which the PSA has been applied) and to do so cleanly, i.e. without leaving any adhesive residue on the receptor. In situations which call for such removal, known PSA composites often leave adhesive residue on the receptor, and/or require more force than is desirable for their removal, for example causing the backing or the receptor to tear (or otherwise deform). These problems are particularly severe in the medical field, when PSA composites must be removed from the human skin; and in situations in which the PSA composite has been attached to the receptor for a long time, since this can increase the strength of the adhesive bond between the receptor and the PSA, and/or decrease the cohesive strength of the PSA, and/or reduce the tackiness of the PSA.

SUMMARY OF THE INVENTION

We have now discovered that these disadvantages can be mitigated or overcome through the use of a PSA which contains a crystalline material, the crystalline material preferably being selected so that the PSA, when heated, has reduced adhesive strength but retains sufficient cohesive strength to allow removal of the PSA composite cleanly from a receptor. Preferably the PSA is made by blending a crystalline additive with a PSA of conventional type.

The crystalline material can produce one or more of a number of different results. One such result is to cause a PSA composite which has a PSA peel strength $P_1$ when removed from a receptor at a temperature $T_1$ to have a lower peel strength $P_2$ when removed from the same receptor at a higher temperature $T_2$. The lower peel strength $P_2$ can be quantified as an absolute difference, i.e. $P_1-P_2$, or as a percentage reduction, i.e. $100(P_1-P_2)/P_1$.

The term "has a PSA peel strength" (and grammatical variations thereof) is used herein to mean that the PSA composite resists removal from the receptor but can be removed cleanly from the receptor, i.e. without leaving a residue of adhesive.

Another possible result of the crystalline material is a PSA composite which undergoes non-adhesive failure when an attempt is made to remove it from a receptor at a temperature ($T_1$) but which can be removed cleanly from the receptor at a higher temperature ($T_2$).

The term "undergoes non-adhesive failure" (and grammatical variations thereof) is used herein to mean that the PSA composite cannot be removed cleanly from the receptor, either because the adhesive fails cohesively, or because the backing ruptures.

Other possible results of the crystalline material can be observed by comparing the behavior of a PSA containing the crystalline material with a comparative composition which is the same except that it does not contain the crystalline material. For example, if a comparative PSA composite containing the comparative composition undergoes non-adhesive failure, the presence of the crystalline material can enable the corresponding PSA composite to be cleanly removed. Alternatively, if the comparative PSA composite has a PSA peel strength at $T_1$ and at a higher temperature $T_2$, the presence of the crystalline material can result in a greater percentage reduction (or a lower percentage increase) in the PSA peel strength as the temperature is increased from $T_1$ to $T_2$.

The change in the behavior of the adhesive preferably takes place over a relatively narrow temperature range. Thus $T_2-T_1$ is preferably less than 50° C., more preferably less than 30° C., particularly less than 20° C., especially less than 10° C.

In a first aspect, this invention provides a pressure-sensitive adhesive composition which comprises (1) a polymeric pressure-sensitive adhesive component (usually referred to herein as the "PSA component"), and (2) a crystalline additive having a first order transition point $T_a$ in the composition;

said composition, when tested for peel strength under selected test conditions as a PSA composite consisting of a selected backing and a layer of the PSA composition of selected thickness, (i) at a selected temperature $T_1$ which is less than $T_a$, having a PSA peel strength $P_1$ or undergoing non-adhesive failure, and (ii) at a selected temperature $T_2$ which is higher than $T_a$, having a PSA peel strength $P_2$;

a comparative composition which is the same as said composition except that it does not contain the additive, when tested for peel strength under the same test conditions, as a comparative PSA composite consisting of the same backing and a layer of the comparative PSA composition of the same thickness, (i) at $T_1$, having a PSA peel strength $P_1^c$ or undergoing non-adhesive failure, and (ii) at $T_2$, having a PSA peel strength $P_2^c$ or undergoing non-adhesive failure;

and at least one of the following conditions being fulfilled (a) $P_1-P_2$ is at least 25 g/cm, (b) $100(P_1-P_2)/P_1$ is at least 25, (c) the PSA composite undergoes non-adhesive failure at $T_1$, (d) the comparative PSA composite undergoes non-adhesive failure at $T_1$ or $T_2$, and (e) $(P_1-P_2)/P_1$ is greater than $(P_1^c-P_2^c)/P_1^c$.

The selected backing, PSA thickness, and test conditions referred to in the definition above include a selected flexible backing to which the PSA is adherent, thus providing a PSA composite, a selected thickness of the layer of PSA carried by the backing, a selected receptor test surface to which the PSA composite is applied, a selected technique for pressing the PSA composite against the receptor, a selected time between pressing the PSA composite against the receptor and carrying out the peel test, and selected conditions during that time, and a selected technique for peeling the PSA composite from the receptor.

The first aspect of the invention includes any PSA for which it is possible to find at least one selected backing, PSA thickness, set of test conditions, and values of $T_1$ and $T_2$ at which at least one of the conditions (a) to (e) is fulfilled. However, the different variables are preferably selected with regard to the conditions under which the PSA is to be used in practice. Thus for many practical uses it is preferred that $T_1$ should be at or close to room temperature, for example about 20° C., and that $T_2$ should be a relatively low temperature, not greater than 100° C., e.g. 40° or 45° C. However, the invention includes adhesives which are not tacky at room temperature, but which become tacky at some elevated temperature; for such adhesives, $T_1$ might for example be 60° C. and $T_2$ might for example be 100° C.

It is preferred, therefore, that the peel strength tests are carried out by (q) using a PSA composite or comparative PSA composite which consists of a backing which is a polyethylene terephthalate film 1.0 mil (0.0025 cm) thick, a woven fabric, or a non-woven material (e.g. a label or a paper tape), and a layer 1.0 mil (0.0025 cm) thick of the solvent-free PSA composition;

(r) applying the PSA composite or comparative PSA composite to a receptor at a temperature at which the PSA is tacky and by a method substantially equivalent to the method described in PSTC-1 or the method described in ASTM-D3330, the receptor being
  (i) a stainless steel plate as specified in Appendage B of PSTC-1,
  (ii) a rigid sheet of extruded high density polyethylene,
  (iii) a rigid sheet of glass, or
  (iv) human skin;

(s) maintaining the assembly of the receptor and the PSA composite produced in step (r) at a temperature which is room temperature (about 19° C.) when the receptor is (i), (ii) or (iii) and body temperature when the receptor is human skin, and for a time of about x minutes, where x is 1,240, 1440, 10,080 or 43,200; and (t) after step (s), peeling the PSA composite from the receptor at an angle of about 180° and at a rate of about 12 inch (30 cm)/minute; and wherein (u)
  (i) the PSA composite and the comparative PSA composite are applied to the receptor at room temperature, $T_1$ is room temperature when the receptor is (i), (ii) or (iii) and body temperature when the receptor is human skin, and $T_2$ is a temperature in the range of 35° to 100° C., or
  (ii) the PSA composite and the comparative PSA composite are applied to the receptor at a temperature above room temperature, $T_1$ is above room temperature, and $T_2$ is $(T_a+p)°$ C., where p is 5–50.

The PSA adhesives of the first aspect of the invention can be in the form of solutions or emulsions, including compositions which are ready for application to a backing and concentrates which must be diluted before such application, or they can be in solvent-free form, as a layer on a backing in a PSA composite or as a self-supporting article, or as a solid concentrate.

In one specific embodiment of the first aspect of the invention, the pressure-sensitive adhesive composition is a pressure-sensitive adhesive at at least one temperature in the range 20° to 40° C., and comprises:

(1) p% by weight, based on solids, of a polymeric pressure-sensitive adhesive component; and
(2) q% by weight, based on solids, of a crystalline polymer additive which
  (a) has a heat of fusion of at least 20 Joules/g,
  (b) is intimately admixed with the polymeric pressure sensitive adhesive component,
  (c) has a first order transition point $T_m°$ C. when measured on its own,
  (d) has a first order transition point $T_a°$ C. when measured in the composition, where $T_a$ is less than $T_m$, and
  (e) has a weight average molecular weight less than about 25,000 Daltons;

p being at least 50, and q being greater than 0 and less than 50 and such that said composition, when tested by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1
  (i) at a temperature $T_1$ which is between $(T_a-10)°$ C. and $(T_a-4)°$ C., having a PSA peel strength $P_1$ g/cm, and
  (ii) at a temperature $T_2$ which is between $(T_a+4)°$ C. and $(T_a+10)°$ C. having a PSA peel strength $P_2$ g/cm, where $100(P_1-P_2/P_1)$ is at least 50;

and said polymeric pressure-sensitive adhesive component, when tested on its own by said IMTI or ISPT procedure, being a pressure-sensitive adhesive at said temperature $T_1$.

In a second aspect, this invention provides a PSA composite which comprises a backing and a solvent-free layer of a PSA according to the first aspect of the invention.

In a third aspect, this invention provides a PSA composite which comprises
  (A) a flexible backing, and
  (B) a solvent-free layer of a pressure-sensitive adhesive composition which comprises
    (1) a PSA component, and
    (2) a crystalline additive having a first order transition temperature $T_a$;

said PSA composite, when tested for peel strength under selected test conditions,
  (i) at a selected temperature $T_1$ which is less than $T_a$, having a PSA peel strength $P_1$ or undergoing non-adhesive failure, and
  (ii) at a selected temperature $T_2$ which is higher than $T_a$, having a PSA peel strength $P_2$;

a comparative PSA composite, which is the same as said composite except that the pressure-sensitive adhesive does not contain the additive, (i) at $T_1$, having a PSA peel strength $P_1^c$ or undergoing non-adhesive failure, and (ii) at $T_2$, having a PSA peel strength $P_2^c$ or undergoing non-adhesive failure;

and at least one of the following conditions being fulfilled (a) $P_1-P_2$ is at least 25 g/cm, (b) $100(P_1-P_2)/P_1$ is at least 25, (c) the PSA composite undergoes non-adhesive failure at $T_1$, (d) the comparative PSA composite undergoes non-adhesive failure at $T_1$ or $T_2$, and (e) $(P_1-P_2)/P_1$ is greater than $(P_1^c-P_2^c)/P_1^c$.

The third aspect of the invention includes any PSA composite for which it is possible to find at least one set of test conditions, and values of $T_1$ and $T_2$, at which at least one of conditions (a) to (e) is fulfilled. However, the variables are preferably selected with regard to the conditions under which the PSA composite is to be used in practice. It is preferred, therefore, that the peel strength tests are carded out in accordance with the preferred conditions (r) to (u) set out above for the peel strength tests.

In one specific embodiment of the third aspect of the invention, the PSA composite comprises (A) a flexible backing, and (B) coated on the backing, a solvent-free layer of a pressure-sensitive adhesive composition which is a pressure-sensitive adhesive at at least one temperature in the range 20° to 40° C., and which comprises:

(1) p% by weight of a polymeric pressure-sensitive adhesive component; and (2) q% by weight of a crystalline polymer additive which (a) has a heat of fusion of at least 20 Joules/g, (b) is intimately admixed with the polymeric pressure-sensitive adhesive component, (c) has a first order transition point $T_m$° C. when measured on its own, (d) has a first order transition point $T_a$° C. when measured in the composition, where $T_a$ is less than $T_m$, and (e) has a weight average molecular weight less than about 25,000 Daltons;

p being at least 50, and q being greater than 0 and less than 50 and such that said composite, when tested by an IMTI procedure using a test surface which is human skin, or by an ISPT procedure using a test surface which is stainless steel as specified in Appendage B of PSTC-1

(i) at a temperature $T_1$ which is between $(T_a-10)$° C. and $(T_a-4)$° C., having a PSA peel strength $P_1$ g/cm, and (ii) at a temperature $T_2$ which is between $(T_a+4)$° C. and $(T_a+10)$° C. having a PSA peel strength $P_2$ g/cm, where $100(P_1-P_2/P_1)$ is at least 50;

and said polymeric pressure-sensitive adhesive component, when tested on its own by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1, being a pressure-sensitive adhesive at said temperature $T_1$.

In a fourth aspect, this invention provides a process for securing a backing to a receptor, in which process a PSA composite according to the second or third aspect of the invention is applied to a receptor at a temperature at which the PSA is tacky.

In one specific embodiment of the fourth aspect of the invention, the process comprises affixing a flexible backing to a receptor by (A) interposing between said flexible backing and said receptor a solvent-free pressure-sensitive adhesive composition which is a pressure-sensitive adhesive at at least one temperature in the range 20° to 40° C., and which comprises:

(1) p% by weight of a polymeric pressure-sensitive adhesive component; and (2) q% by weight of a crystalline polymer additive which (a) has a heat of fusion of at least 20 Joules/g, (b) is intimately admixed with the polymeric pressure-sensitive adhesive component, (c) has a first order transition point $T_m$° C. when measured on its own, (d) has a first order transition point $T_a$° C. when measured in the composition, where $T_a$ is less than $T_m$, and (e) has a weight average molecular weight of less than about 25,000 Daltons;

p being at least 50, and q being greater than 0 and less than 50 and such that said composition, when the receptor is human skin, when tested by an IMTI procedure using said flexible backing and a test surface which is human skin, and, when the receptor is any other surface, when tested by an ISPT procedure using said flexible backing and a test surface which is said receptor (i) at a temperature $T_1$ which is between $(T_a-10)$° C. and $(T_a-4)$° C., having a PSA peal strength $P_1$ g/cm, and (ii) at a temperature $T_2$ which is between $(T_a+4)$° C. and $(T_a+10)$° C. having a PSA peel strength $P_2$ g/cm, where $100(P_1-P_2/P_1)$ is at least 50;

and said polymeric pressure-sensitive adhesive component, when tested on its own by said IMTI or ISPT procedure, being a pressure-sensitive adhesive at said temperature $T_1$; and (B) pressing the backing against the receptor, with the pressure-sensitive adhesive composition between them, while the adhesive composition is at a temperature which is below $T_a$ and at which the composition is tacky.

In a fifth aspect, this invention provides an assembly which comprises a receptor and, adherent thereto, a PSA composite according to the second or third aspect of the invention.

In a sixth aspect, this invention provides an assembly which comprises a receptor and a PSA composite which is adherent to the receptor and which comprises (A) a flexible backing, and (B) between the backing and the receptor, a layer of a pressure-sensitive adhesive composition which comprises (1) a PSA component, and (2) a crystalline additive having a first order transition temperature $T_A$;

said PSA composite, when tested for peel strength from said receptor under selected test conditions, (i) at a selected temperature $T_1$ which is less than $T_a$, having a PSA peel strength $P_1$ or undergoing non-adhesive failure, and (ii) at a selected temperature $T_2$ which is higher than $T_a$, having a PSA peel strength $P_2$;
and at least one of the following conditions being fulfilled
 (a) $P_1-P_2$ is at least 25 g/cm,
 (b) $100(P_1-P_2)/P_1$ is at least 25, and
 (c) the PSA composite undergoes non-adhesive failure at $T_1$.

The sixth aspect of the invention includes any assembly for which it is possible to find at least one set of test conditions, and values of $T_1$ and $T_2$, at which at least one of conditions (a), (b) and (c) is fulfilled. However, the variables are preferably selected with regard to the way in which the PSA composite is likely to be removed from the receptor in practice. It is preferred therefore that the tests are carried out in accordance with the preferred conditions (t) and (u) set out above for the peel strength tests.

In one specific embodiment of the sixth aspect of the invention, the assembly comprises
 (A) a flexible backing; and
 (B) coated on the backing, a solvent-free layer of a pressure-sensitive adhesive composition which is a pressure-sensitive adhesive at at least one temperature in the range 20° to 40° C., and which is adherent to the receptor and which comprises
  (1) p% by weight of a polymeric pressure-sensitive adhesive component, and
  (2) q% by weight of a crystalline polymer additive which
   (a) has a heat of fusion of at least 20 Joules/g,
   (b) is intimately admixed with the polymeric pressure-sensitive adhesive component,
   (c) has a first order transition point $T_m$° C. when measured on its own,
   (d) has a first order transition point $T_a$° C. when measured in the composition, where $T_a$ is less than $T_m$, and
   (e) has a weight average molecular weight less than about 25,000 Daltons;
p being at least 50, and q being greater than 0 and less than 50 and such that said PSA composite, when peeled away from the receptor at an angle of about 180° and at a rate of about 12 inch/minute
 (i) at a temperature $T_1$ which is between $(T_a-10)$° C. and $(T_a-4)$° C., having a PSA peel strength $P_1$ g/cm, and
 (ii) at a temperature $T_2$ which is between $(T_a+4)$° C. and $(T_a+10)$° C. having a PSA peel strength $P_2$ g/cm, where $100(P_1-P_2/P_1)$ is at least 50; and said polymeric pressure-sensitive adhesive component, when tested on its own by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1, being a pressure-sensitive adhesive at said temperature $T_1$.

In a seventh aspect, this invention provides a process for removing a PSA composite according to the second or third aspect of the invention from a receptor to which the PSA composite is bonded, in which process the PSA composite is heated and is then removed from the receptor while the PSA is at an elevated temperature.

In an eighth aspect, the invention provides a process for removing the PSA composite from the receptor in an assembly according to the fourth or fifth aspect of the invention, in which process the PSA composite is heated and is then removed from the receptor while the PSA is at an elevated temperature.

In the processes according to the seventh and eighth aspects of the invention, the PSA composite is preferably heated to a temperature of at least $T_a$ (the first order transition point of the crystalline additive). However, in some cases, particularly when the additive melts over a range, a useful reduction in bond strength can result when the PSA is at some lower temperature, for example a temperature which, on a differential scanning calorimeter (DSC) curve for the PSA, is in the range from the beginning of melting of the additive to the peak of the DSC curve (which is the first order transition point $T_a$ of the additive in the PSA). This range is preferably less than 10° C., particularly less than 5° C.

In a ninth aspect, this invention provides a process for removing a PSA composite from a receptor to which it is adhered, the PSA composite comprising
 (A) a backing, and
 (B) between the backing and the receptor, a layer of a pressure-sensitive adhesive composition which comprises
  (1) a PSA component, and
  (2) a crystalline additive having a first order transition temperature $T_a$,
which process comprises reducing the PSA peel strength of the PSA composite by heating the PSA composite from a temperature below $T_a$ to a temperature above $T_a$, and removing the PSA composite from the receptor while the PSA composite is at a temperature above $T_a$.

In one specific embodiment of the ninth aspect of the invention, the PSA composite comprises
 (A) a flexible backing; and
 (B) coated on the backing, a solvent-free layer of a pressure-sensitive adhesive composition which is a pressure-sensitive adhesive at at least one temperature in the range 20° to 40° C., and which is adherent to the receptor and which comprises
  (1) p% by weight of a polymeric pressure-sensitive adhesive component, and
  (2) q% by weight of a crystalline polymer additive which
   (a) has a heat of fusion of at least 20 Joules/g,
   (b) is intimately admixed with the polymeric pressure-sensitive adhesive component,
   (c) has a first order transition point $T_m$° C. when measured on its own,
   (d) has a first order transition point $T_a$° C. when measured in the composition, where $T_a$ is less than $T_m$, and
   (e) has a weight average molecular weight less than about 25,000 Daltons;
p being at least 50, and q being greater than 0 and less than 50; and the process comprises
heating the PSA composite from a temperature below $T_a$ to a temperature above $T_a$, thereby reducing its PSA peel strength, and removing the PSA composite from the receptor while the PSA composite is at a temperature above $T_a$.

In the specific embodiments of the first, third, fourth, six and ninth aspects of the invention as set out above, preferred features include the following:

(1) p is 50 to 90, e.g. 65 to 85, particularly 70 to 80, and q is 10 to 50, e.g. 15 to 35, preferably 20 to 30.

(2) p is at least 65 and q is 10 to 50.

(3) The composition is in the form of a solution of the polymeric PSA component and the additive in an organic solvent.

(4) The composition is in the form of a solvent-free layer adherent to a backing, the thickness of the layer being preferably at least 0.5 mil and preferably less than 1.8 mil, and the layer preferably becoming clear when heated.

(5) The composition, when in the form of a solvent-free layer 1.6 to 1.8 mil thick and adherent to a backing which is a 1.5 mil thick film of polyethylene terephthalate (Mylar), has a tack value greater than about $10^{-2}$ cm$^{-2}$ at a temperature within the range $T_a$ to $(T_a-10)°$ C.

(6) The polymeric PSA component, when tested on its own by the ISPT procedure, is a PSA at room temperature and/or at 32° to 36° C.

(7) The weight average molecular weight of the additive is 3,500 to 25,000, e.g. 3,500 to 12,000.

(8) The polymeric PSA component is selected from the group consisting of natural rubber adhesives; thermoplastic rubbers of the A-B-A block copolymer type, where A represents a thermoplastic polystyrene end block and B represents a rubber midblock of polyisoprene, polybutadiene or poly(ethylene/butylene); butyl rubbers; polyisobutylenes; and polymers and copolymers of vinyl ethers.

(9) The additive is a crystalline polymer which contains side chains comprising crystallizable moieties, preferably a polymer wherein the weight of the crystallizable moieties is at least twice the weight of the remainder of the additive. The additive can comprise repeating units derived from at least one monomer selected from acrylates, methacrylates, acrylamides and methacrylamides containing linear aliphatic groups containing 14 to 50 carbon atoms, e.g. 16 to 22 carbon atoms, and can also comprise units derived from acrylic acid and/or butyl acrylate. In one class of such additives, the additive consists essentially of 75 to 100% by weight of repeating units derived from at least one monomer selected from acrylates, methacrylates, acrylamides and methacrylamides containing linear aliphatic groups containing 14 to 50 carbon atoms, and 0 to 25% by weight of repeating units derived from at least one monomer selected from acrylic acid and butyl acrylate.

(10) The additive has a first order transition point on its own, $T_m$, of 20° C. to 102° C., preferably 30° to 48° C.

(11) The additive has a first order transition point in the composition, $T_a$, of 33° C. to 63° C., preferably 33° C. to 40.5° C.

(12) The additive has a $T_m$ and a $T_a$ such that $T_m-T_a$ is 1° to 9° C.

(13) The additive is a crystalline polymer comprising a crystallizable main chain, e.g. a polymer of at least one monomer having the formula $CH_2=CHR$, where R is hydrogen or a linear or branched alkyl group containing 1 to 8 carbon atoms.

(14) The polymeric PSA component has a glass transition point below about 10° C.

(15) The polymeric PSA component is an acrylic adhesive or a styrene-butadiene-rubber adhesive.

(16) The PSA composite is a bandage, tape, wound closure, or wound dressing for use in the medical or surgical field, or a label, e.g. a label carrying a price code or a bar code, and preferably the adhesive composition has a tack value greater than about $10^{-2}$ cm$^{-2}$ at room temperature and the PSA composite, when tested by said IMTI procedure, has a PSA peel strength of at least 57 g/cm at 34° C. and a PSA peel strength of less than 7 g/cm at 42° C.

(17) The receptor to which the PSA composite is applied is porous, e.g. human skin, or non-porous, e.g. a glass container or other merchandisable product.

(18) In the process in which the PSA composite is removed from a receptor,
 (a) the composite is heated to a temperature of 40° C. or higher,
 (b) the PSA composite has a PSA peel strength $P_1$ g/cm at a temperature below $T_a$, e.g. at room temperature, or at 32° C., or at 36° C., and a PSA peel strength $P_2$ g/cm at the temperature of the PSA composite while it is being removed, and $100(P_1-P_2)P_1$ is at least 50.

BRIEF DESCRIPTION OF THE DRAWING

The invention is illustrated in the accompanying drawing, in which.

DETAILED DESCRIPTION OF THE INVENTION

Figure 1:
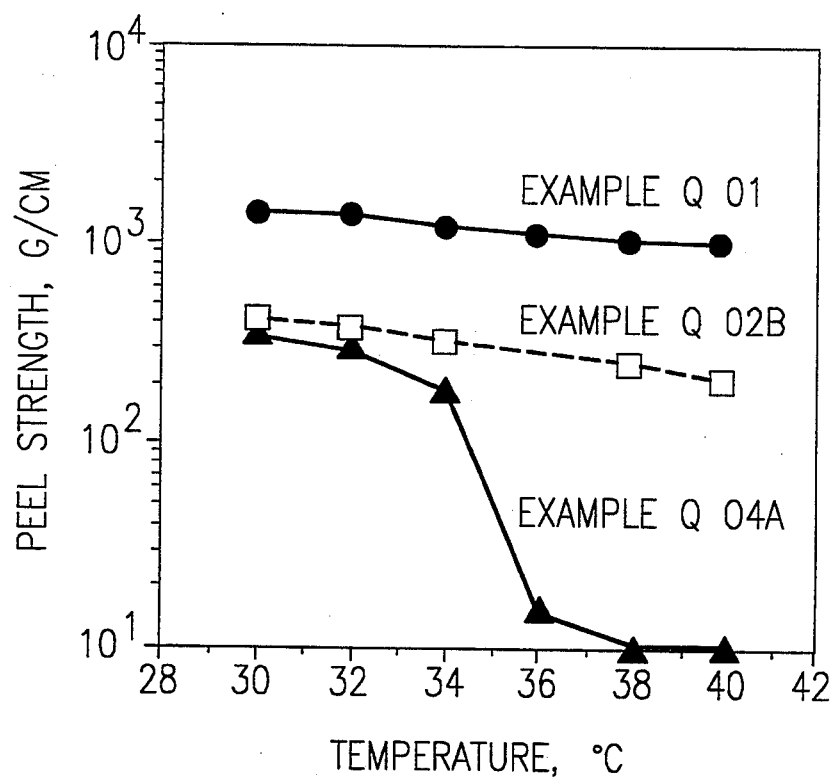
FIGS. 1 and 2 illustrate the results of Peel and Tack Tests carried out in Examples Q01, Q02B and Q04A, as further described below.

In this specification, parts, amounts and percentages are by weight unless otherwise stated; temperatures are in ° C; molecular weights are in Daltons and are weight average molecular weights determined by gel phase chromatography; first order transition points (often referred to as melting points) are determined by a differential scanning calorimeter (DSC), the peak of the DSC curve being the transition point; peel strengths are in g/cm and are determined by the methods described in detail in the Examples; tack values are in g/cm$^2$ and are determined by ASTM D2979; moisture vapor transmissions (MVT) are in g/m$^2$/24 hours and are measured by ASTM E96-90 at 37° C. at a relative humidity difference of 100% to 10%; and solubility parameters are in J$^{\frac{1}{2}}$/cm$^{3/2}$ and are calculated using the group contributions according to Fedors (D. W. van Krevelen, *Properties of Polymers*, published by Elsevier, 2nd Edn, p. 138).

In the first, third and sixth aspects of the invention, when condition (a) is applicable, $P_1-P_2$ is at least 25, preferably at least 35, particularly at least 50, especially at least 75, g/cm; when condition (b) is applicable, $100(P_1-P_2)/P_1$ is at least 25, preferably at least 30, particularly at least 40, especially at least 50; and when condition (c) is applicable, $P_2$ is preferably less than 300, particularly less than 200, especially less than 100, g/cm.

In the first and third aspects of the invention, when condition (d) is applicable, the comparative PSA composite undergoes non-adhesive failure at $T_1$ or $T_2$ (or both), and $P_1-P_2$ is preferably positive, e.g. at least 25, more preferably at least 35, particularly at least 50, especially at least 75, g/cm, and/or preferably $100(P_1-P_2)/P_1$ is at least 25, more preferably at least 30, particularly at least 40, especially at least 50.

In the first and third aspects of the invention, when condition (e) is applicable, $(P_1-P_2)/P_1$ is greater than $(P_1{}^c-P_2{}^c)/P_1{}^c$. Generally $(P_1{}^c-P_2{}^c)/P_1{}^c$ will be positive (i.e. the comparative PSA decreases in peel strength on warming), in which case the ratio of $(P_1-P_2)/P_1$ to $(P_1{}^c-P_2{}^c)/P_1{}^c$ is preferably at least 1.2, particularly at least 1.5, especially at least 2. When $(P_1{}^c-P_2{}^c)/P_1{}^c$ is negative, $(P_1-P_2)/P_1$ may also be negative (though less negative) but is preferably positive.

PSA COMPONENTS

The PSA component used in the present invention can be one of the known PSA's and can comprise a base polymer alone or a mixture of a base polymer and one or more additives such as tackifiers, plasticizers, fillers, stabilizers and pigments. Reference may be made for example to the following publications and patents which describe PSA's and uses thereof, and the disclosures of which are incorporated herein by reference. Encyclopedia of Polymer Science and Engineering 13, 345-368 (John Wiley, 1988); Handbook of Pressure-Sensitive Adhesive Technology (Van Nostrand Reinhold, 1982); Adhesives Technology Handbook, 154-156 (Noyes, 1985); Handbook of Adhesive Bonding, 8-1 to 8-17 (McGraw Hill, 1982); U.S. Pat. Nos. 3,284,423, 3,299,010, 3,535,195, 3,635,754, 3,690,937, 3,838,079, 3,922,464, 3,935,338, 3,956,223, 3,975,323, 4,140,115, 4,151,319, 4,152,189, 4,335,026, 4,356,222, 4,487,872, 4,728,572, 4,762,888, 4,783,354, and 4,879,178; U.K. Patent No. 870,022; PCT Publication Nos. WO84/03837, 91/14461 and 91/14462; European Patent Publication No. 062682; and Japanese Patent Application Nos. 039,016/56 (1981), 003,966/59 (1984), 093,771/59 (1984), and 012,405/64 (1989).

Known PSA's which can be used to provide the PSA component in this invention include PSA's based on polymers of one or more acrylic or methacrylic esters; olefin copolymers; polysiloxanes; polyurethanes; polymers of vinyl esters; polyamides; and natural and synthetic rubbers, in particular natural rubber adhesives; styrene/butadiene latex-based adhesives; thermoplastic rubbers of the A-B-A block copolymer type (where A represents a thermoplastic polystyrene end block and B represents a rubber midblock of polyisoprene, polybutadiene or poly(ethylene/butylene)); butyl rubber; polyisobutylene; acrylic adhesives such as polyacrylates and vinyl acetate/acrylic ester copolymers; and polymers and copolymers of vinyl ethers such as polyvinylmethyl ether, polyvinylethyl ether, and polyvinylisobutyl ether. The base polymer in the PSA component may be a single polymer, or a mixture of polymers, and may be used or mixed with other ingredients such as plasticizers, tackifiers, fillers and stabilizers.

Preferred base polymers for use in the present invention, particularly for PSA's to be used in the medical field, are polyacrylates. Known PSA polyacrylates are described for example in U.S. Pat. Nos. 4,732,808 and 4,737,410, the disclosures of which are incorporated herein by reference. Suitable polyacrylates include polymers of one or more alkyl or substituted alkyl, e.g. hydroxyalkyl or alkoxyalkyl, acrylates or methacrylates, and optionally methacrylic or acrylic acid, or of corresponding monomers which result in the same or similar repeating units in the polymer, e.g. acrylamides and methacrylamides. The alkyl groups may be straight or branched, and preferably include 2 to 18, particularly 2 to 12, carbon atoms. Monomers which can be used include 2-hydroxyethyl, ethoxyethyl and 2-ethylhexyl acrylates. Usually one or more of the monomers have low glass transition points and give the polymer flexibility, and one or more of the monomers increase the toughness of the polymer, e.g. by hydrogen bonding, or provide a site for crosslinking, or provide a functional group to improve wetting to a particular backing or receptor. Preferred base polymers for use in this invention include copolymers comprising (A) 75 to 99% of units derived from at least one monomer which is an ester of acrylic or methacrylic acid and a primary or secondary alcohol which contains 1 to 18 carbons, the average number of carbons in such units being 4 to 12; and (B) 1 to 25% of units derived from a copolymerizable ethylenically unsaturated monomer, preferably acrylic acid, methacrylic acid, itaconic acid, acrylamide, methacrylamide, acrylonitrile, methacrylonitrile, vinyl acetate, vinyl pyrrolidone, or the like.

We have obtained particularly good results using polymers of 60 to 98% 2-ethylhexyl acrylate, 0-10% acrylic acid, 0-30% ethoxyethyl acrylate, and 0-15% 2-hydroxyethyl acrylate. The molecular weight of the polymer may be for example from 500,000 to 2,000,000.

Additives

One measure of the crystallinity of a material is its heat of fusion, as measured by a DSC curve. The crystalline additives used in this invention preferably have a heat of fusion of at least 20 Joules/g, particularly at least 40 Joules/g, for examples 60 to 120 Joules/g.

The first order transition point ($T_a$) of the additive is determined from a DSC curve of the additive-containing PSA, in which melting of the crystalline additive (or the crystalline part of the additive) causes the curve to rise to a peak at $T_a$. $T_a$ may be the same as the first order transition point (or melting point) of the additive on its own, which is referred to herein as $T_m$ or mp. However, $T_a$ and $T_m$ can differ from each other by a significant amount, reflecting an interaction between the PSA component and the additive. The difference can be as high as 10° C. or even higher, and is preferably at least 0.6°, more preferably at least 1° C., particularly at least 1.5° C., especially at least 2° C.

The $T_a$ of the crystalline additive should be selected having regard to the intended use of the PSA. For a PSA which is to be used at room temperature, $T_a$ should generally be greater than 23°, preferably greater than 25°, particularly greater than 30°, especially greater than 35°, in order to ensure that the peel strength remains undiminished during normal use. For a PSA which is to be used at a higher temperature, $T_a$ is preferably at least 3° higher than the highest expected temperature during normal use. For example, in a PSA which is to be attached to human skin, $T_a$ is preferably at least about 37° C., particularly at least about 38° C., especially at least about 40° C. On the other hand $T_a$ should not be so high as to require that the PSA be heated to an excessive temperature in order to reduce its peel strength, for example to a temperature which will damage or unduly soften the backing or the receptor. Thus $T_a$ is preferably not more than 120° C., more preferably not more than about 100° C., particularly not more than about 60° C. For a PSA which is to be attached to human skin, $T_a$ is preferably not more than about 45° C., particularly not more than about 42° C.

Preferred additives for use in the present invention are crystalline polymers in which the crystallinity results exclusively or predominantly from side chains which are attached to the polymer backbone. Such polymers are often referred to as side chain crystallizable polymers, or SCC's, and include polymers of one or more monomers such as substituted and unsubstituted acrylates, fluoroacrylates, vinyl esters, acrylamides, maleimides, α-olefins, p-alkyl styrenes, alkylvinyl ethers, alkylethylene oxides, triglycerides (e.g. tristearin and pentaerythritol tetrastearate), alkyl phosphazenes and amino acids; polyisocyanates; polyurethanes; and polysiloxanes; as described for example in J. Poly. Sci. 60, 19 (1962), J. Poly. Sci, (Polymer Chemistry) 7, 3053 (1969), 9, 1835, 3349, 3351, 3367, 10, 1657, 3347, 18, 2197, 19, 1871, J. Poly. Sci, Macromol. Rev, 8, 117 (1974), Macromolecules 12, 94 (1979), 13, 12, 15, 18, 2141, 19, 611, JACS 75, 3326 (1953), 76; 6280, Polymer J 17, 991 (1985); and Poly. Sci USSR 21, 241 (1979).

SCC's for use in this invention can be broadly defined as polymers which comprise repeating units of the general formula

where Y is an organic radical forming part of a polymer backbone and Cy comprises a crystallizable moiety and is preferably present in amount such that the SCC has a heat of fusion of at least 20 Joules/gram. The crystallizable moiety may be connected to the polymer backbone directly or through a divalent organic or inorganic radical, e.g. an ester, amide, hydrocarbon (for example phenylene), or ether link, or through an ionic salt linkage (for example a carboxyalkyl ammonium, sulfonium or phosphonium ion pair). The radical Cy may be alphatis or aromatic, for example alkyl of at least 10 carbons, fluoroalkyl of at least 6 carbons or p-alkyl styrene wherein the alkyl contains 6 to 24 carbons. The SCC may contain two or more different repeating units of this general formula. The SCC may also contain other repeating units, but the amount of such other units is preferably such that the total weight of the crystallizable moieties is at least twice the weight of the remainder of the polymer. An example of a polymer containing such other units is a copolymer of styrene, vinyl acetate, acrylic acid, methylstyrene, and hexadecyl acrylate in amounts of 5, 5, 2, 5, and 83 parts.

Preferred SCC's for use in this invention comprise side chains containing in total at least 5 times as many carbon atoms as the polymer backbone, particularly side chains comprising linear polymethylene moieties containing 12 to 50, especially 14 to 22, carbon atoms. Polymers containing such side chains can be prepared by polymerizing one or more corresponding linear aliphatic acrylates, methacrylates, acrylamides or methacrylamides, optionally with one or more other monomers selected from other alkyl acrylates, methacrylates (e.g. glycidal methacrylate), acrylamides and methacrylamides; acrylic and methacrylic acids; acrylamide; methacrylamide; maleic anhydride; and comonomers containing amine groups. Such other monomers are generally present in total amount less than 50%, particularly less than 35%, especially less than 25%, e.g. 0 to 15%. They may be added to modify the melting point or other physical properties of the SCC, or to provide sites for crosslinking. The melting point of an SCC containing such polymethylene side chains is influenced by the number of carbon atoms in the crystallizable side chains. For example, homopolymers of n-alkyl acrylates containing 14, 16, 18, 20, 22, 30, 40 and 50 carbons respectively typically have melting points of 20°, 36°, 49°, 60°, 71°, 76°, 96° and 102° C., while the homopolymers of the corresponding n-alkyl methacrylates typically have melting points of 10°, 26°, 39°, 50°, 62°, 68°, 91° and 95° C. Copolymers with other monomers, e.g. acrylic acid or butyl acrylate, typically have somewhat lower melting points. In making such polymers, the molecular weight of the polymer (and hence its melting point) can also be influenced by the reaction conditions and through the addition of a chain transfer agent.

Preferred additives for use in this invention are polymers comprising 60 to 100% of units derived from at least one monomer selected from the group consisting of alkyl acrylates, alkyl methacrylates, N-alkyl acrylamides, vinyl ethers, and vinyl esters containing 12 to 30, preferably 12 to 22 carbon atoms, 0 to 20% of units derived from at least one monomer selected from the group consisting of alkyl acrylates, alkyl methacrylates, N-alkyl acrylamides, vinyl ethers, and vinyl esters containing 4 to 12 carbon atoms, and 0 to 15% of units derived from at least one polar monomer selected from the group consisting of acrylic acid, methacrylic acid, itaconic acid, acrylamide, methacrylamide, acrylonitrile, methacrylonitrile, vinyl acetate and N vinyl pyrrolidone. Such polymers may also include other monomers to improve compatibility with the base resin, or to raise the modulus of the crystalline material, e.g. include styrene, vinyl acetate, monoacrylic functional polystyrene and the like.

The acrylate SCC's are particularly useful in conjunction with polyacrylate base polymers.

The molecular weight of the SCC or other crystalline additive is preferably less than 25,000, particularly less than 12,000. In one class of additives, the molecular weight is 3,500 to 25,000, preferably 3,500 to 12,000. However, we have also obtained excellent results, particularly with acrylate SCC's, using molecular weights of less than 3,500. Thus in another class of additives, the molecular weight is 500 to 4,000, especially 1,500 to 4,000.

Other crystalline additives are polymers in which the crystallinity results exclusively or predominantly from the polymer backbone, e.g. polymers of α-olefins containing 2 to 12, preferably 2 to 8, carbon atoms, e.g. polymers of monomers having the formula $CH_2{=}CHR$, where R is hydrogen, methyl, propyl, butyl, pentyl, 4-methylpentyl, hexyl or heptyl, polyalkylene oxides, polyesters, polyamides and polytetrahydrofuran. Such polymers may have molecular weight greater than 25,000, e.g. 25,000 to 900,000, typically 100,0000 to 900,0000. Such high molecular weight polymers typically have melting points which are so high that it is not preferred, and may be impractical, to reduce the peel strength of the PSA by heating it to a temperature above $T_a$. However, by cooling PSA's containing such additives, their tackiness and bond strength, especially to non-porous receptors can be sharply reduced.

Especially when a PSA having a good moisture vapor transmission rate (MVTR) is desired, the base polymer or the additive or both may include, either in the backbone or in a side chain or both, recurring units derived from a hydrophilic comonomer, e.g. acrylic acid, acrylamide, a hydroxyalkyl acrylate, e.g. hydroxyethyl or hydroxybutyl or 3-methoxybutyl acrylate, ethyltriglycol acrylate, and the methacryl equivalents thereof. Derivatives of polyethylene glycol with a molecular weight of 50 to 5,000 are also useful.

Another way of increasing MVTR is to incorporate in the PSA a separate hydrophilic material, e.g. carboxymethyl cellulose, guar gum, carrageenan, or cellulosic fibers.

For medical use, the PSA preferably has an MVTR of at least 300, particularly at least 500, g/m$^2$/day, and preferably is secured to a backing having an MVTR of at least 100, particularly at least 500 g/m$^2$/day, optionally in form of a border and/or stripes, so that part of the backing is not covered by the PSA.

Preparation of PSA's and PSA Composites

The PSA's of the invention can be prepared by mixing the base polymer and the crystalline additive, and any other desired ingredients, e.g. tackifiers (e.g. wood rosin, polyesters, etc.), antioxidants, fillers (fibrous or non-fibrous) and colorants, in any convenient way. The mixing can be carried out in a liquid medium which is a solvent for some or all of the ingredients, e.g. an organic solvent for both the base polymer and the additive, or which is an aqueous medium. Each of the ingredients can be added to the mixture as a solid, or as a molten liquid, or as a solution, emulsion or dispersion, as appropriate. The resulting liquid mixture, i.e. solution, emulsion or dispersion in a liquid carrier, can be applied, if desired after further dilution, to the backing in conventional fashion, e.g. by spraying, painting, dipping or rolling, and then dried to produce a solvent-free coating (the term "solvent-free" being used herein to mean that the PSA is substantially free from any liquid medium, whether or not any ingredient of the PSA was dissolved therein). The solvent-free coating may be covered by a release sheet until the PSA composite is used. It is also possible to form a layer of the solvent-free PSA on a release coating and to transfer the layer to the backing.

Methods of making the novel PSA's include the following.

1. Methods in which a solution of the additive is mixed with a solution of the base polymer, the solvents in the two solutions being miscible with each other, or being the same.
2. Methods in which the additive, in molten form, is dispersed in a solution or emulsion of the base resin which is at a temperature above the melting point of the additive. To effect such dispersion, high shear mixing techniques may be used and surfactants or other stabilizers may also be added to assist the dispersion process and/or to improve the stability of the product. The dispersion is preferably carried out under conditions such that the particle size of the additive in the product is less than about 10 microns, particularly less than about 5 microns.
3. Methods in which a solution of the additive and the base polymer in a common solvent (or mixture of solvents), e.g. THF (tetrahydrofuran), is prepared, and the solution is then emulsified in water, e.g. by high shear mixing with the aid of surfactants. If desired, any residual solvent can be removed by sparging or evaporation, optionally under reduced pressure.
4. Methods in which the base polymer is prepared by emulsion polymerization and the additive is also prepared by emulsion polymerization, and the resulting products are mixed in the desired proportions. Methods for preparing acrylate polymers (as well as other polymers) by emulsion polymerization are well known. Reference may be made for example to British Polymer Journal 20, 521-524 (1988) and the references cited therein.
5. Methods in which the base polymer and the additive are prepared simultaneously or sequentially in the same reaction vessel by emulsion polymerization using separate monomer feed streams.

The relative amounts of the PSA component and the additive can vary widely. The PSA can for example comprise 1 to 99% of the PSA component and 1 to 99% of the additive. In one class of PSA's, the PSA component is present in amount 50 to 99%, preferably 65 to 95%, particularly 70 to 90%, especially 70 to 80%, and the additive is present in amount 1 to 50%, preferably 5 to 35%, particularly 10 to 30%, especially 20 to 30%. Surprisingly, we have found that satisfactory PSA's can be obtained even when the additive is not in itself a PSA and is the major component of the composition. Thus in another class of PSA's, the base resin is present in amount less than 50%, e.g. 5 to 50%, and the additive is present in amount more than 50%, e.g. 50 to 95%.

The solubility parameter of the PSA component ($\delta_1$) and the solubility parameter of the additive ($\delta_2$) are preferably such that $\delta_2$ is from ($\delta_1-1.5$) to ($\delta_1+3.0$), particularly from ($\delta_1-1$) to ($\delta_1+2$), especially from ($\delta_0.5$) to ($\delta_1+1.5$).

The additive should also be selected with regard to the base polymer preferably so that they are substantially miscible at a temperature above $T_a$, e.g. ($T_a+10$)° C., but only partially miscible at a temperature below $T_a$, e.g. ($T_a-10$)° C. Substantial miscibility can result in the composition being clear at the relevant temperature, and partial miscibility can result in the composition being cloudy at the relevant temperature, at least in the absence of other ingredients which mask such appearance. The additive and the base polymer will preferably have chemical structures which promote such miscibility characteristics. For example the additive may be a polymer in which 10 to 85%, e.g. 15 to 50%, of the repeating units are the same or substantially the same as repeating units in the base polymer, and/or in which 50 to 100%, e.g. 75 to 100%, of the repeating units are linked together through linkages which are the same, or of substantially the same type, as in the base polymer.

In a preferred aspect of this invention, the appearance of the PSA (or some other characteristic thereof which can easily be monitored) changes as the PSA is heated (or cooled) to a temperature at which the PSA peel strength is reduced. This result can be achieved through the use of ingredients which cause the composition to change color, or to change from transparent to opaque or vice versa, as it is heated to a temperature close to $T_a$, e.g. to a temperature in the range ($T_a-5$)° C. to ($T_a+10$)° C., preferably ($T_a-2$) to ($T_a+5$)° C. For example, an appropriate thermochromic material can be added to the PSA for this purpose.

In the PSA composites of the invention, the thickness of the layer of the novel PSA is preferably about 0.7 to 2.5 mil (0.0018 to 0.0065 cm). However, greater thicknesses can be used, e.g. up to about 25 mil (0.065 cm) and may be preferred when the receptor has an irregular surface. The PSA may be in the form of a continuous layer over the whole surface of the backing, the layer being of uniform thickness or varying in thickness according to a desired pattern. There may be different novel PSA's in the layer, either mixed together, or in discrete areas. Alternatively, the novel PSA may be in the form of a discontinuous layer which covers only part of the backing, e.g. as a border, as stripes or as discrete areas. The novel PSA may be the only PSA in the composite, or another PSA, e.g. a conventional PSA, may also be present. The other PSA may be present in one or more discrete areas separate from (but optionally abutting) the novel PSA, e.g. as a continuous or discontinuous layer which has the same or a different thickness as the novel PSA layer. Alternatively, the other PSA may be in the form of a continuous or discontinuous layer which lies between the backing and the novel PSA, which thus provides the exposed surface of the PSA composite as it is applied to, or removed from, a receptor. In this embodiment, the ratio of the thickness of the conventional PSA to the thickness of the novel PSA may be for example from 1 to 10, preferably 2 to 5; the thickness of the novel PSA is preferably about 0.2 to 2 mil (0.0005 to 0.005), particularly about 0.4 to 1.5 mil (0.001 to 0.004 cm); and the total thickness of the PSA layer is preferably 1 to 25 mil (0.006 to 0.065 cm), particularly 1.5 to 5 mil (0.004 to 0.012 cm).

The PSA's of the invention can be applied to any appropriate backing, including for example tapes and films of synthetic or natural polymers (including release sheets), woven and non-woven fabrics, and paper products such as labels, paper tapes and cardboard.

For medical uses, backings having MVT's compatible with human skin, e.g. an MVTR of at least 500 g/m$^2$/day, are preferred. Suitable backings for medical uses are disclosed in European Patent Application Nos. 0107915 and 0147119 and PCT Application No. GB91/00496, the disclosures of which are incorporated herein by reference.

Since the PSA composite will be heated when it is removed from the receptor, it is important that the properties of the backing should be satisfactory not only at the normal use temperature but also at the removal temperature. In particular, it is important that the backing should not break or stretch unduly during the removal process. For many composites, it is preferred that the strength of the backing should be at least 1.7 pounds per linear inch (pli) (0.3 kg/cm), particularly at least 2.5 pli (0.45 kg/cm) at a temperature of $(T_a+5)°$ C., e.g. at 45° C. Polymeric film backings having such strength can readily be prepared from polymers having a modulus at $(T_a+5)°$ C. of at least 2000 psi (140 kg/cm$^2$), preferably at least 3000 psi (210-kg/cm$^2$).

Use of the PSA Composites

Particularly preferred uses of the invention are in the medical field, for example for items such as wound dressings (e.g. those sold under the trade name "Bandaid") and tapes which are used to secure items to patients, e.g. bandages, intravenous drip tubes, catheters, and electrodes. Such items should not irritate the skin and should meet other very exacting standards, including adequate bond strength even when exposed to moisture, high humidity, and body fluids, compliance with skin movement, and easy and clean removal without removing skin or hair from the patient or otherwise causing trauma.

Other uses for the invention are masking tapes to be used by painters, labels which may later need to be removed, e.g. from glass jars and bottles, wallpapers which may later need to be removed, and sheets of the PSA which are attached to a release sheet and can be used for mounting photographs and the like.

When a PSA of the invention is at a temperature substantially below $T_a$, the presence of the additive can result in a reduction of the tackiness of the PSA. Thus if a PSA composite of the invention is applied to a receptor at a temperature at which the PSA is tacky, and is then cooled, e.g. by application of ice or a cold pack, it may become less firmly bonded to, or even disbonded from, the receptor, especially when the receptor is smooth. If this result is desired and the receptor is rough or porous, the PSA can be lightly crosslinked (either through the use of radiation or by including a chemical crosslinking agent and subsequently heating the PSA to activate the agent) in order to inhibit its penetration into the irregularities of the receptor. Such crosslinking can also be useful for other purposes.

EXAMPLES

The invention is illustrated by the following Examples, in which the following materials were used.

PSA Components

| | |
|---|---|
| SBR1 | A styrene/butadiene rubber (SBR) PSA which is available as a solution (solids contents about 45%) from Morton International under the trade name Morstik 103. |
| SBR2 | A styrene/butadiene rubber PSA which is available as a solution from Morton International under the trade name Morstik 112. |
| PSL1 | A polysiloxane PSA which is available as a solution from Dow Chemical under the trade name X7-4201, and which is believed to be essentially poly dimethyl siloxane having a solubility parameter of about 15.10. |
| AC1 | An acrylic PSA which is available from Monsanto Chemical as a solution under the trade name Gelva 737. |
| AC2 | An acrylic PSA which is available as a solution from Morton International under the trade name Morstik 607. |
| AC3 | An acrylic PSA which is an acrylic polymer having a molecular weight greater than 1 million and which was supplied as a solution in acetone (solids content about 34%). The polymer contains about 6% by weight of units derived from acrylic acid and is believed to contain about 47% by weight of units derived from butyl acrylate and about 47% by weight of units derived from 2-ethylhexyl acrylate, and which is believed, therefore, to have a solubility constant of about 18.44. |
| AC4-13 | Copolymers of the monomers and amounts thereof set out in Table A below. Table A also shows the molecular weight and solubility parameter of each resin. |
| AC14 | A blend of 75 parts of AC12 and 25 parts of a resin obtained by reacting, at 60° C. for 20 minutes, equal parts of AC5, AC7 and AC9 in the presence of 0.02% diphenylmethylene diisocyanate and 0.005% dibutyl tin dilaurate. |
| AC15 | A blend of (a) 65 parts of a mixture of equal parts of AC11, AC12 and AC13, and (b) 35 parts of a mixture of equal parts of AC8, AC9 and AC 10. |
| AC16 | A blend of equal parts of AC8, AC9 and AC10. |

Resin AC5 was made as follows. The two monomers, and azoisobutyronitrile (AIBN) as initiator, about 0.5 part, and dodecyl mercaptan (about 0.02 part), were combined in ethyl acetate (150 parts), and heated under nitrogen for 16 hours at about 70° C. The resulting polymer was used as a solution in ethyl acetate. Resins AC4 and 6 were also made similarly. Resins AC7-13 were made similarly, using about 200 parts, about 122 parts, about 230 parts and about 142 parts of ethyl acetate respectively in making resins AC7, AC8-10, AC11 and AC12–13; a reaction temperature of about 45° C., 60° C., 55° C. and 50° C. respectively in making resins AC7, AC8-10, AC11 and 13, and AC12; and about 0.06, 0.38, 0.375, 0.275, 0.175 and 0.1875 parts respectively of AIBN in making resins AC7, AC8 and 10, AC9, AC11, AC12 and AC13.

TABLE A

|  | Base Resin No. AC | | | | |
|---|---|---|---|---|---|
|  | 4 | 5 | 6 | 7 | 8 |
| 2-ethyl hexyl acrylate | 70 | 95 | 95 | 95 | 92 |
| acrylic acid | 5 | 5 | 5 | 5 | — |
| ethoxy ethyl acrylate | 25 | — | — | — | — |
| 2-hydroxy ethyl acrylate | — | — | — | — | 8 |
| Molecular Weight (K) | 741 | 603 | 694 | 1400 | 504 |
| Solubility parameter ($\partial_1$) | 18.41 | 18.2 | 18.2 | 18.2 | 18.11 |

|  | Base Resin No. AC | | | | |
|---|---|---|---|---|---|
|  | 9 | 10 | 11 | 12 | 13 |
| 2-ethyl hexyl acrylate | 92 | 92 | 92 | 92 | 92 |
| acrylic acid | — | — | — | — | — |
| ethoxy ethyl acrylate | — | — | — | — | — |
| 2-hydroxy ethyl acrylate | 8 | 8 | 8 | 8 | 8 |
| Molecular Weight (K) | 531 | 570 | 882 | 1750 | 1750 |
| Solubility parameter ($\partial_1$) | 18.11 | 18.11 | 18.11 | 18.11 | 18.11 |

| Additives | |
|---|---|
| PB | Polybutene, available from Amoco under the trade name Polybutene H, solubility constant ($\delta_2$) 15.53. |
| PE | Polyethylene, mp 71° C., available from Petrolite Specialty Chemical Co. under the trade name Vybar 103, $\delta_2$ 17.51. |
| LAN | Lanolin, mp about 45° C. |
| MS | Methyl stearate, mp about 42° C., $\delta_2$ 17.62. |
| TL | Trilaurin, mp about 46° C., $\delta_2$ 18.53. |
| EIC | Eicosane, mp about 37° C., $\delta_2$ 16.6. |
| LA | Lauric Acid, mp about 40° C., $\delta_2$ 19.14. |
| MP | Methyl palmitate, mp about 27° C., $\delta_2$ 17.64. |
| PHMS | Polymethylhexadecyl siloxane, MW 10,000, mp about 35° C., available from Huls under the trade name PS-35, $\delta_2$ 17.99. |
| SCC 1-23 | Additives SCC 1-23 were copolymers of the monomers and amounts thereof set out in Table B below. Table B also shows the molecular weight and crystalline melting point ($T_m$) of each of these additives |

Additive SCC1 was made as follows. Octadecylacrylate (425 g), butylacrylate (65 g), acrylic acid (10.5 g), azobisisobutyronitrile (AIBN) (5 g), and dodecyl mercaptan (25 g), which is a chain transfer agent added to control molecular weight, were combined in toluene (1000 ml), and heated under nitrogen for 12 hours at 80° C. The reaction mixture was poured into methanol and the precipitate recovered. Additives SCC 2–4, 6 and 12 were made by the same general procedure. Additive SCC 5 was made as follows. Octadecylacrylate (588 g), acrylic acid (12 g), and AIBN (1 g) were combined in ethyl acetate (1200 ml), and heated under nitrogen for 48 hours at 45° C. The resulting polymer was recovered in the same way as Additive SCC 1. Additives SCC 7–11, 13–18, 21 and 22 were made by reacting the ingredients shown in Table B at 100° C. for 2.5 hours, using ethyl acetate as solvent, t-butylperoctate (available from Witco Chemical under the trade name Esperox 28) as initiator and dodecyl mercaptan as a chain transfer agent to control the molecular weight of the polymer (5 parts in making SCC 7–11, and 11.4, 21, 42, 42, 21, 4, 21 and 21 parts respectively in making SCC 13, 14, 15, 16, 17, 18, 21 and 22). The resulting polymers were used as a solution in ethyl acetate.

Additive SCC 19 was made by placing the monomers, ethyl acetate (150 parts) as a solvent, AIBN (1 part) as an initiator, and dodecyl mercaptan (1.5 part) as a chain transfer agent, inside a sealed glass bottle which was then maintained with stirring at about 60° C. for about 51 hours. Additive SCC 20 was made similarly using t-butyl peroctoate (2 parts) instead of AIBN and 21 parts of dodecyl mercaptan.

TABLE B

|  | Additive No. SCC | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Octadecyl Acrylate | 85 | 94 | 97 | — | 98 | 94 | 85 | 80.8 | 78.6 | 76.5 | 72.25 | 96 |
| Butyl Acrylate | 13 | 6 | 3 | — | — | 6 | 13 | 14.2 | 13.9 | 13.5 | 12.75 | 4 |
| Docosanyl Acrylate | — | — | — | 100 | — | — | — | — | — | — | — | — |
| Hexadecyl Acrylate | — | — | — | — | — | * | — | — | — | — | — | — |
| Acrylic Acid | 2 | — | — | — | 2 | — | 2 | 5 | 7.5 | 10.0 | 15 | — |
| Molecular Weight (K) | 7.9 | 6.1 | 6.5 | 7.5 | 744 | | 8 | 8.7 | 9.1 | 9.0 | 8.2 | 6 |
| Melting Point (°C.) | 41.6 | 44.7 | 45.1 | 71 | 48 | 29 | 40.2 | 40.4 | 43.3 | 43.3 | 42.6 | 45 |
| Solubility Parameter ($\partial_2$) | 18.5 | 17.77 | 17.74 | 17.69 | 17.74 | 17.77 | 18.15 | 18.6 | 18.93 | 19.22 | 19.72 | 17.75 |

|  | Additive No. SCC | | | | | | | | | |
|---|---|---|---|---|---|---|---|---|---|---|
|  | 13 | 14 | 15 | 16 | 17 | 18 | 19 | 20 | 21 | 22 |
| Octadecyl Acrylate | 38.1 | 81.7 | 94 | 74 | 81.7 | 1 | 43 | — | — | — |
| Butyl Acrylate | — | — | — | — | — | — | — | — | — | — |
| Docosanyl Acrylate | — | — | — | 21 | — | — | — | — | — | — |
| Hexadecyl Acrylate | 57.1 | 13.5 | 1 | — | 13.3 | 94 | 52 | 100 | 98 | 95 |
| Acrylic Acid | 2.5 | 5 | 5 | 5 | 5 | 5 | 5 | — | 2 | 5 |
| Molecular Weight | 4 | 2 | 1 | 1 | 2 | 10 | 21 | 2 | 2 | 2 |

TABLE B-continued

| (K) | | | | | | | | | | |
|---|---|---|---|---|---|---|---|---|---|---|
| Melting Point (° C.) | 37.3 | 38.4 | 39.6 | 35.5 | 39 | 35 | 40 | 36.6 | 37.9 | 38.3 |
| Solubility Parameter ($\partial_2$) | 18.23 | 18.66 | 18.66 | 18.69 | 18.62 | 18.64 | 17.76 | 17.74 | 18.02 | 18.61 |

*In making Additive SCC 6, sufficient hexadecyl acrylate was used to reduce the melting point of the product to about 29° C.

Compositions

A number of compositions were made as follows. A PSA component and one or more additives as specified in Table C below were placed in a glass jar, together with appropriate solvents. Table C shows the amount of each additive (when free of solvent). The amount of the PSA component (as solids) is 100-x, where x is the stated amount of the additive(s). In some of the compositions, no additive was present. If necessary, further solvent, e.g. toluene or heptane, was added to reduce the solids content of the composition to about 45%. The ingredients were blended until a homogeneous mixture was obtained, and the blend was then placed on a roller mill to remove all gas bubbles.

As briefly noted above, PSA components SBR 1, SBR 2, AC 1 and AC 2 were commercially available as solvent-based compositions, and in some cases it was found that better mixing of the PSA component and additive(s) could be achieved through the use of other solvent systems. For example AC1 is a solution of an acrylic polymer in a mixture of solvents, namely toluene (11–12%) and two polar solvents, ethyl acetate (48–53%) and ethanol (36–40%), which were found to impede satisfactory mixing with the additives. In Example A4, therefore, before the additive was added to the PSA component, the polar solvents were replaced by adding an amount of toluene equal to the amount of the polar solvents, and subjecting the resulting mixture to rotary vacuum evaporation at a temperature below 45° C. and at 60–76 cm Hg pressure until all the polar solvents had been removed. The solvent systems used in Examples B 1 and B2; Q1 and Q2; Q3; Q4 and Q5; Q6; Q7; Q8; Q9; and Q10 respectively were ethyl acetate/isopropanol/pentadione; ethyl acetate/toluene/cyclohexane, 80/3/17; h/t/c (i.e. hexane/toluene/cyclohexane), 69/17/14; h/t/c, 64/23/13; h/t/c, 69/20/11; h/t/c, 76/12/12; h/t/c, 69/20/11; h/t/c, 55/31/14; h/t/c, 62/24/14; and xylene.

Application of Compositions to Backings

The resulting compositions were placed on film backings as identified in Table C., in the following way. The film was secured to a flat glass plate 18×12 inch (46×30.5 cm) and smoothed to remove air bubbles between the film and the plate. The film was a polyethylene terephthalate ("Mylar") film, 1.0 mil (0.0025 cm) thick, or a polyester thermoplastic elastomer ("Hytrel" 4056) film, 1.75 mil (0.0045 cm) thick. A wire-wound applicator rod (No. 70 Gardco Wet Film Applicator Rod) was then used to apply a coating of the composition to the film. The coating was dried in air at room temperature for 10 minutes and then in an oven at 90° C. for 15 minutes or more. The dried coating thickness was about 1.6 to 1.8 mil (0.0040 to 0.0046 cm) in Examples A01–A04, B01, B02, Q01–10, and Z3, about 1.5 mil (0.0038 cm) in Examples Z1 and Z2, and about 1 mil in the other Examples. The coating thickness did not vary significantly; thus on some specimens, measurements were made at three or more different places on a specimen; these measurements were found to vary by at most 0.25 mil (0.0006 cm). The coating was covered with a siliconized release sheet. The release sheet was a siliconized Mylar film when the backing was the Mylar film, and a siliconized polyethylene-impregnated paper when the backing was the Hytrel film. The resulting laminate was removed from the glass plate and samples about 5.0×1.0 inch (12.5×2.5 cm) were cut from the laminate, with the length of the samples in the extrusion direction of the film backing.

Testing of the Coated Backings

Samples prepared in the way described above were tested in one or both of the following procedures.

Peel Tests on Human Skin

An Instron Materials Testing Instrument (IMTI) was used to conduct peel strength tests on samples applied to human skin. After removing the release sheets, two identical samples were placed on the underside of the forearm of an adult, with the length of the strips parallel to the arm bone. Light hand pressure was applied to the entire surface of the strips. After about 4 hours, one end of one strip was detached from the skin and attached to a clip which was attached by a wire to the load cell of an IMTI. The sample was then removed by peeling it off at a rate of 10 inch (25.4 cm) per minute, the sample being bent back over itself at an angle of about 180°. The other strip was removed in the same way, except that a hair dryer was used to warm the entire strip to a temperature of about 40° C. before it was peeled off. The average peel strength for each strip was recorded at room temperature (LT) and at the higher temperature (HT).

Peel Tests on Other Test Surfaces

Peel tests on other test surfaces were conducted by the test procedure designated PSTC-1 (revision 8/85) by the Pressure-Sensitive Tape Council (PSTC), using an Instrumentors Inc. SP-102B Slip/Peel Tester. After removing the release sheet, the sample was placed on the test surface. The test surface was (a) stainless steel as specified in Appendage B of the PSTC Test Methods for Pressure-Sensitive Tapes, referred to herein as SS, or (b) a polyurethane film 0.012 inch (0.03 cm) thick (available under the trade name Tuftane from Lord Corporation, Erie, Pa.), referred to herein as PU. The test surface was secured with double-sided adhesive tape to the temperature-controlled platen. The sample was immediately pressed against the test surface by means of a 4.5 lb. (2 kg) roller which travelled over the sample in both directions at a rate of 12 inch (30 cm) per minute in both directions. The peel strength at a prescribed lower temperature (LT) or higher temperature (HT) was determined. Unless otherwise noted, LT was 30° C., HT was 45° C., and the test was carried out 5 minutes after the sample had been applied.

The results obtained are set out in Table C below.

TABLE C

| COMPOSITION | TESTING |
|---|---|

TABLE C-continued

| EX NO. | PSA Component | Additive Type | Amount | ∂2 − ∂1 | BACKING | Test Surface | Peel Strength LT | HT | % decrease |
|---|---|---|---|---|---|---|---|---|---|
| A01 | AC1 | — | — | — | Mylar | PU | 96.3 | 103 | |
| A02 | AC1 | SCC1 | 15 | — | Mylar | PU | 67.4 NT | 58 | 14 |
| A03 | AC1 | SCC1 | 25 | — | Mylar | PU | 61.7 NT | 16.1 | 74 |
| A04 | AC1 | SCC1 | 35 | — | Mylar | PU | 72.5 NT | 20.0 | 72 |
| A05 | AC1 | SCC1 | 55 | — | Mylar | PU | <15 NT | <15 | |
| B01 | AC2 | — | — | — | Mylar | PU | 117 | 92.2 | 21 |
| B02 | AC2 | SCC1 | 35 | — | Mylar | PU | 55 NT | 12.7 | 77 |
| C01 | AC3 | — | — | — | Mylar | Skin | 70 | 65 | 7 |
| C02 | AC3 | — | — | — | Hytrel | Skin | 57.5 | 77 | |
| C03A | AC3 | SCC8 | 25 | +0.16 | Mylar | SS | 30.7 | 46.5 | |
| C03B | AC3 | SCC8 | 25 | +0.16 | Mylar | Skin | 45 | 7 | 84 |
| C04A | AC3 | SCC13 | 25 | −0.21 | Mylar | SS | 18.5 | 8.9 | 52 |
| C04B | AC3 | SCC13 | 25 | −0.21 | Mylar | Skin | 40 | 8 | 80 |
| C05A | AC3 | SCC14 | 25 | +0.22 | Mylar | SS | 21 | 12 | 43 |
| C05B | AC3 | SCC14 | 25 | +0.22 | Mylar | Skin | 38 | 10 | 73 |
| C06A | AC3 | SCC15 | 25 | +0.23 | Mylar | SS | 14.7 | 17 | |
| C06B | AC3 | SCC15 | 25 | +0.23 | Mylar | Skin | 28 | 2 | 92 |
| C07 | AC3 | SCC16 | 25 | +0.25 | Hytrel | Skin | 30 | 7 | 77 |
| C08 | AC3 | SCC17 | 25 | +0.22 | Hytrel | Skin | 44 | 24 | 45 |
| C09 | AC3 | SCC13 | 25 | −0.21 | Hytrel | Skin | 28 | 22 | 21 |
| C10 | AC3 | SCC18 | 25 | +0.18 | Hytrel | Skin | 24 | 19 | 21 |
| C11 | AC3 | SCC19 | 25 | +0.20 | Hytrel | Skin | 38 | 68 | |
| C12A | AC3 | MS | 25 | −0.82 | Mylar | Skin | 125 | 230 | |
| C12B | AC3 | MS | 25 | −0.82 | Hytrel | Skin | 72 | 113 | |
| C13 | AC3 | TL | 25 | +0.09 | Mylar | Skin | 0 | 0 | |
| C14 | AC3 | EIC | 25 | −0.84 | Mylar | Skin | 0 | 0 | |
| C15 | AC3 | LA | 25 | +0.70 | Mylar | Skin | CF | CF | |
| C16 | AC3 | MP | 25 | −0.80 | Mylar | Skin | CF | CF | |
| D01 | AC4 | SCC7 | 25 | −0.26 | Hytrel | SS | 102.8 | 82 | 20 |
| D02 | AC4 | SCC8 | 25 | +0.19 | Hytrel | SS | 61.9 | 45.5 | 26 |
| D03 | AC4 | SCC9 | 25 | +0.52 | Hytrel | SS | 60.1 | 15.6 | 74 |
| D04 | AC4 | SCC10 | 25 | +0.81 | Hytrel | SS | 67.6 | 29.7 | 56 |
| D05 | AC4 | SCC11 | 25 | +1.31 | Hytrel | SS | 70 | 156CF | |
| E01 | AC5 | SCC7 | 25 | −0.05 | Mylar | SS | 32 | 32 | |
| E02 | AC5 | SCC8 | 25 | +0.40 | Mylar | SS | 75 | 18 | 76 |
| E03 | AC5 | SCC9 | 25 | +0.73 | Mylar | SS | 80 | 17 | 79 |
| E04 | AC5 | SCC10 | 25 | +1.02 | Mylar | SS | 104 | 17.6 | 83 |
| E05 | AC5 | SCC11 | 25 | +1.52 | Mylar | SS | 104 | 80.15 | 23 |
| E06 | AC5 | — | — | — | Hytrel | Skin | 185 | 213CF | |
| E07 | AC5 | SCC22 | 25 | +0.41 | Hytrel | Skin | 300CF | 60 | 80 |
| E08 | AC5 | SCC22 | 50 | +0.41 | Hytrel | Skin | 125 | 25 | 80 |
| F01 | AC6 | — | — | — | Mylar | SS | 275 | 206 | 25 |
| F02 | AC6 | SCC9 | 0.5 | +0.73 | Mylar | SS | 138 | 58 | 58 |
| F03 | AC6 | SCC9 | 3.85 | +0.73 | Mylar | SS | 78 | 42 | 46 |
| F04 | AC6 | SCC9 | 12.3 | +0.73 | Mylar | SS | 64 | 15 | 77 |
| F05 | AC6 | SCC9 | 20.0 | +0.73 | Mylar | SS | 60 | 15 | 75 |
| G01(1) | AC7 | — | — | — | Mylar | Skin | 70 | 70 | |
| G01(2) | AC7 | — | — | — | Mylar | Skin | 50 | 54 | |
| G02A | AC7 | SCC8 | 25 | +0.40 | Mylar | SS | 16.4 | 9.6 | 41 |
| G02B | AC7 | SCC8 | 25 | +0.40 | Mylar | Skin | 26 | 6 | 77 |
| G03A | AC7 | SCC13 | 25 | +0.03 | Mylar | SS | 16.7 | 7.6 | 55 |
| G03B | AC7 | SCC13 | 25 | +0.03 | Mylar | Skin | 30 | 8 | 73 |
| G04A | AC7 | SCC14 | 25 | +0.46 | Mylar | SS | 13 | 8.7 | 33 |
| G04B | AC7 | SCC14 | 25 | +0.46 | Mylar | Skin | 20 | 2 | 90 |
| G05A | AC7 | SCC15 | 25 | +0.47 | Mylar | SS | 23 | 21 | 09 |
| G05B | AC7 | SCC15 | 25 | +0.47 | Mylar | Skin | 100 | 64 | 36 |
| G06 | AC7 | SCC20 | 25 | −0.46 | Mylar | Skin | 65 | 22 | 66 |
| G07 | AC7 | SCC21 | 25 | −0.18 | Mylar | Skin | 170 | 24 | 86 |
| G08 | AC7 | SCC22 | 25 | +0.41 | Mylar | Skin | 151 | 5 | 97 |
| G09 | AC7 | MS | 25 | −0.58 | Mylar | Skin | 125 | 230 | |
| G10 | AC7 | TL | 25 | +0.33 | Mylar | Skin | 0 | 0 | |
| G11 | AC7 | EIC | 25 | −1.6 | Mylar | Skin | 0 | 0 | |
| G12 | AC7 | LA | 25 | +0.94 | Mylar | Skin | CF | CF | |
| G13 | AC7 | MP | 25 | −0.56 | Mylar | Skin | CF | CF | |
| H01 | AC12 | — | — | — | Mylar | Skin | 70 | 120 | |
| H02 | AC12 | MS | 25 | −0.13 | Mylar | Skin | 86 | 51 | 41 |
| H03 | AC12 | TL | 25 | +0.78 | Mylar | Skin | 0 | 0 | |
| H04 | AC12 | EIC | 25 | −0.15 | Mylar | Skin | 58 | 82 | |
| H05 | AC12 | LA | 25 | +1.39 | Mylar | Skin | 75 | 105 | |
| H06 | AC12 | MP | 25 | — | Mylar | Skin | CF | CF | |
| I01 | AC14 | — | — | — | Mylar | Skin | 354 | 375CF | |
| I02 | AC14 | SCC13 | 25 | +0.12 | Mylar | Skin | 163 | 58 | 64 |
| I03 | AC14 | SCC14 | 25 | +0.55 | Mylar | Skin | 167 | 22.4 | 87 |
| I04 | AC14 | SCC15 | 25 | +0.56 | Mylar | Skin | 54 | 33 | 40 |
| J01 | AC15 | — | — | — | Hytrel | Skin | 92 | 106 | |
| J02 | AC15 | SCC16 | 25 | +0.58 | Hytrel | Skin | 139 | 102 | 27 |
| J03 | AC15 | SCC17 | 25 | +0.55 | Hytrel | Skin | 188 | 56 | 70 |
| J04 | AC15 | SCC13 | 25 | +0.12 | Hytrel | Skin | 166 | 36 | 78 |
| J05 | AC15 | SCC18 | 25 | +0.51 | Hytrel | Skin | 109 | 51 | 53 |
| J06 | AC15 | SCC19 | 25 | +0.53 | Hytrel | Skin | 125 | 198CF | |

TABLE C-continued

| | | | | | | | | | |
|---|---|---|---|---|---|---|---|---|---|
| J07 | AC15 | MS | 25 | −0.49 | Hytrel | Skin | 138 | 116 | 16 |
| K01 | AC16 | — | — | — | Hytrel | Skin | CF | CF | |
| K02 | AC16 | SCC22 | 25 | +0.50 | Hytrel | Skin | 165CF | 10 | 94 |
| K03 | AC16 | SCC22 | 50 | +0.50 | Hytrel | Skin | 50 | 5 | 90 |
| P01 | PSL12 | PHMS | 14.3 | +2.89 | Mylar | SS | 300 | 172 | 43 |
| Q01 | SBR1 | — | — | — | Mylar | SS | 1398 | 1066 | 24 |
| Q02A | SBR1 | LAN | 13 | — | Hytrel | Skin | 61 | 54 | 11 |
| Q02B | SBR1 | LAN | 13 | | Mylar | SS | 400 | 200 | 50 |
| Q03 | SBR1 | LAN | 35 | — | Mylar | SS | 410 | 248 | 40 |
| Q04A | SBR1 | SCC3(i) LAN(ii) | 22 13 | | Mylar | SS | 305(NT) | 10 | 97 |
| Q04B | SBR1 | SCC3(i) LAN(ii) | 22 13 | | Hytrel | Skin | 57(NT) | 7 | 88 |
| Q05 | SBR1 | SCC5(i) LAN(ii) | 22 13 | | Hytrel | Skin | 29(NT) | 25 | 14 |
| Q06 | SBR1 | SCC2 | 15 | — | Mylar | SS | Low(NT) | 598 | |
| Q07 | SBR1 | SCC5 | 25 | — | Mylar | SS | Low(NT) | 393 | |
| Q08 | SBR1 | SCC4 | 25 | — | Mylar | SS | Low(NT) | High | |
| Q09 | SBR1 | EIC | 25 | — | Mylar | SS | 195(NT) | 10 | 95 |
| Q10 | SBR1 | PE | 25 | — | Mylar | SS | Low(NT) | High | |
| R01A | SBR2 | SCC12(i) PB(ii) | 13 9 | — | Hytrel | Skin | 53 | 13 | 81 |
| R01B | SBR2 | SCC12(i) PB(ii) | 13 9 | | Mylar | SS | 504 | 49 | 90 |
| R02 | SBR2 | SCC12(i) LAN(ii) | 5 5 | — | Mylar | SS | 679 | 515 | 24 |
| R03 | SBR2 | SCC12(i) LAN(ii) | 5 20 | | Mylar | SS | 315 | 84 | 73 |
| R04 | SBR2 | SCC12(i) LAN(ii) | 12.5 12.5 | | Mylar | SS | 299 | 0 | 100 |
| R05 | SBR2 | SCC12(i) LAN(ii) | 20 5 | | Mylar | SS | 337 | 0 | 100 |
| R06 | SBR2 | SCC12(i) LAN(ii) | 20 20 | | Mylar | SS | 178 | 0 | 100 |

Notes to TABLE C
1) In a number of the Examples, the melting point of the compositions was measured and found to be as follows

| Example No. | A04 | B02 | Q02 | Q04 | Q05 | Q06 | Q07 | Q08 | Q09 | Q10 |
|---|---|---|---|---|---|---|---|---|---|---|
| mp (°C.) | 40.5 | 40.0 | 39 | 38 | 39 | 34 | 39 | 63 | 33 | 62.6 |

Figure 2:
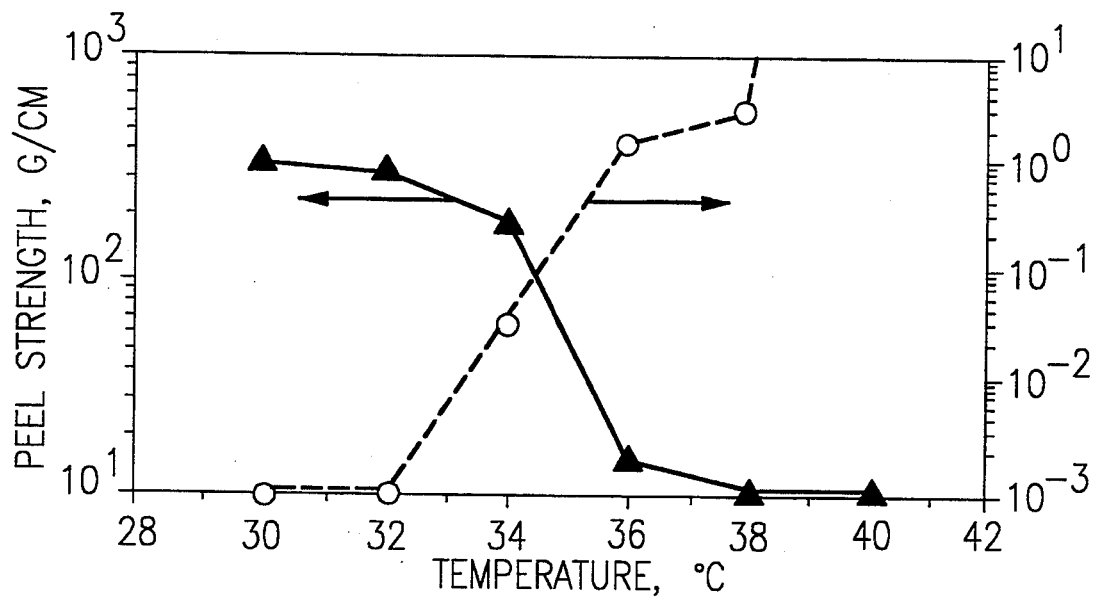
Figure 3:
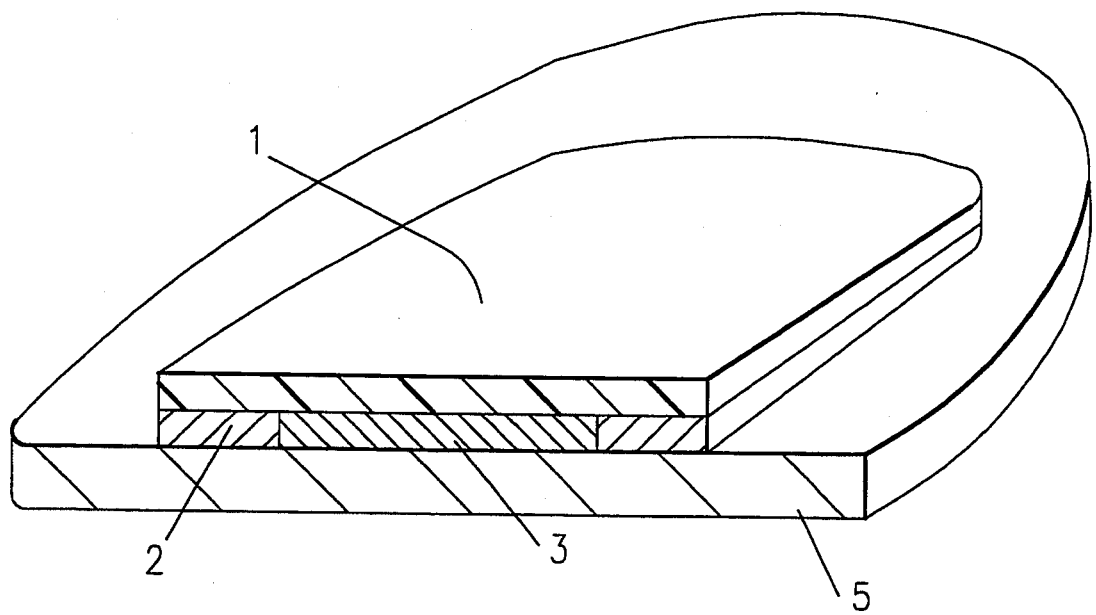
FIG. 3 illustrates partly in cross-section, a PSA composite of the invention, comprising a backing; a layer of a novel PSA adhesive 2 which is in the form of a border and surrounds a sterilized wound dressing 3, and a receptor 5, e.g. human skin.
Figure 4:
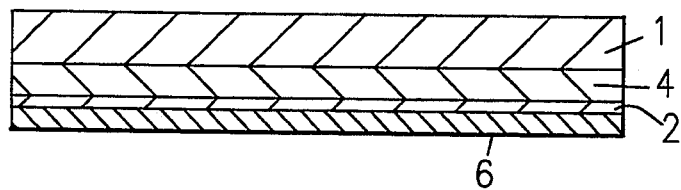
FIG. 4 is a cross-section through a PSA composite of the invention comprising a backing 1, a layer 4 of a conventional PSA, a layer 2 of a PSA of the invention, and a release sheet 6.

2. In Examples A02-05, B02, Q03, Q04(A), and Q06-10, the lower peel test temperature (LT) was 4° C. below the melting point of the composition and the higher peel test temperature (HT) was 4° C. above the melting point of the composition.
3. In Examples Q01, Q02B and Q04A, the sample peel tests were carried out at 30° (LT), 32°, 34°, 36°, 38° and 40° (HT), except that no test was carried out at 36° in Example Q02B. The results at 30° and 40° are shown in Table C and all the results are shown graphically in FIG. 1.
4. The tack value of the coated backing in Example Q04A was determined at 30°, 32°, 34°, 36° and 38° C., and the results are shown graphically in FIG. 2, which also shows the peel strength at these temperature.
5. The higher peel test temperature (HT) was 40° C. in Example R01 and 42° C. in Examples R02-06.
6. The coatings in Examples R02-06 had the following levels of tack at room temperature.

| Example No. | R02 | R03 | R40 | R05 | R06 |
|---|---|---|---|---|---|
| | Excellent | Good | Slight | Poor | Slight |

7. Most of the coatings were tacky at room temperature. However, some were not, and this is indicated by the notation NT in Table C after the LT test strength. These samples were applied to the test surface at a temperature at which they were tacky.
8. In the column headed "% decrease" (in peel strength) " " means that there was no decrease or that the results were not meaningful because there was cohesive failure of the adhesive.

EXAMPLE Z1

The composition of Example Q04 was used to make a film 1.5 mil (0.00375 cm) thick on a siliconized release film. The back of a 3×5 inch (7.5×12.5 cm) photograph was lightly sanded, and the adhesive film placed against the sanded surface. The assembly was put in a press at 45° C. and 5,000 psi (350 kg/cm²) for 5 minutes. The assembly was removed, and cooled under pressure from a 5 lb. (2.2 kg) weight. Excess adhesive was removed and the release film removed. The adhesive was not tacky at room temperature (19° C.). The assembly was gently warmed with a hair dryer until the adhesive was tacky, placed (adhesive side down) on a page of photograph album, and secured in place by rubbing the face gently with a clean cloth. After cooling for one minute, an attempt to remove a corner of the photograph resulted in tearing of the page below that corner. The same result was obtained after storage overnight at room temperature, and after storage overnight in a refrigerator, followed by warming to room temperature. However, when the photograph was reheated with a hair dryer, it could be easily removed without damage to the photograph or the page and without leaving any residue or stain on the page.

EXAMPLE Z2

A composition containing 65 parts of SBR1, 22 parts of SCC 6 and 13 parts LAN was used to make a film 1.5 mil (0.00375 cm) thick on a siliconized release film. The adhesive film was placed on a sheet of newspaper and the assembly was put in a press at 45° C. and 5000 psi (350 kg/cm²) for 5 minutes. After cooling, strips 1×2 cm were cut from the assembly, and, after removal of the release film, three strips were applied to each of a glass jar, a plastic pen, a stainless steel panel and a magazine. After one hour, an attempt was made to remove one of the strips from each test surface; all tore during removal. After storage in a refrigerator overnight, an attempt was made to remove another strip from each test surface; the strip on the magazine tore during removal, but all the others could be removed without tearing. After heating with a hair dryer, an attempt was made to remove the last strip from each test surface; all could be removed without tearing and without leaving a residue on the test surface.

EXAMPLE Z3

Three samples of the kind used in Example Q04B were applied to one arm of each of three adults, using the peel test procedure described above except that the removal rate was 1 inch (2.5 cm)/second. After 1 hour, a first strip was removed from each adult at room temperature. After 6 hours, a second strip was removed after it had been cooled with an ice cube for 10 seconds. After 24 hours, the last strip was removed after it had been heated with a hair dryer. Removal of the first two strips caused pain, and hair and portions of the stratum corneum were found on the removed strips. The last strip was removed without pain and no hair or cellular debris were observed on the removed strip.

What is claimed is:

1. A pressure-sensitive adhesive (PSA) composition which comprises
   (1) at least 50% by weight of a polymeric pressure-sensitive adhesive component, and
   (2) a crystalline polymeric additive having a weight average molecular weight of less than 25,000 and a first order transition point $T_a$ in the composition greater than 23° C.;

said composition, when tested for peel strength under selected test conditions as a PSA composite consisting of a selected backing and a layer of the PSA composition of selected thickness,
   (i) at a selected temperature $T_1$ which is less than $T_a$ and is from 20° C. to 60° C., having a PSA peel strength $P_1$, and
   (ii) at a selected temperature $T_2$ which is higher than $T_a$ and is not greater than 100° C., having a PSA peel strength $P_2$;

a comparative composition which is the same as said composition except that it does not contain the additive, when tested for peel strength under the same test conditions, as a comparative PSA composite consisting of the same backing and a layer of the comparative PSA composition of the same thickness,
   (i) at $T_1$, having a PSA peel strength $P_1^c$ or undergoing non-adhesive failure, and
   (ii) at $T_2$, having a PSA peel strength $P_2^c$ or undergoing non-adhesive failure;

and at least one of the following conditions being fulfilled
   (a) $P_1-P_2$ is at least 25 g/cm,
   (b) $100(P_1-P_2)/P_1$ is at least 25,
   (c) the comparative PSA composite undergoes non-adhesive failure at $T_1$ or $T_2$, and
   (d) $(P_1-P_2)/P_1$ is greater than $(P_1^c-P_2^c)/P_1^c$.

2. A PSA composition according to claim 1 wherein the peel strength tests are carried out by
   (q) using a PSA composite or comparative PSA composite which consists of a backing which is a polyethylene terephthalate film 1.0 mil (0.0025 cm) thick, a woven fabric, or a non-woven material, and a layer 1.0 mil (0.0025 cm) thick of the solvent-free PSA composition;
   (r) applying the PSA composite or comparative PSA composite to a receptor at a temperature at which the PSA is tacky and by a method substantially equivalent to the method described in PSTC-1 or the method described in ASTM-D3330, the receptor being
      (i) a stainless steel plate as specified in Appendage B of PSTC-1,
      (ii) a rigid sheet of extruded high density polyethylene,
      (iii) a rigid sheet of glass, or
      (iv) human skin;
   (s) maintaining the assembly of the receptor and the PSA composite produced in step (r) at a temperature which is room temperature (about 19° C.) when the receptor is (i), (ii) or (iii) and body temperature when the receptor is human skin, and for a time of about x minutes, where x is 1,240, 1440, 10,080 or 43,200; and
   (t) after step (c), peeling the PSA composite from the receptor at an angle of about 180° and at a rate of about 12 inch (30 cm)/minute;

and wherein
   (u)
      (i) the PSA composite and the comparative PSA composite are applied to the receptor at room temperature, $T_1$ is room temperature when the receptor is (i), (ii) or (iii) and body temperature when the receptor is human skin, and $T_2$ is a temperature in the range of 35° to 100° C., or
      (ii) the PSA composite and the comparative PSA composite are applied to the receptor at a temperature above room temperature, $T_1$ is above room temperature, and $T_2$ is $(T_a+p)°$ C., where p is 5–50.

3. A PSA composition according to claim 1 wherein, when condition (a) is applicable, $P_1-P_2$ is at least 35 g/cm; when condition (b) is applicable, $100(P_1-P_2)/P_1$ is at least 30; when condition (c) is applicable, the comparative PSA composite undergoes non-adhesive failure at $T_1$ or $T_2$ (or both), and $P_1-P_2$ is at least 25 g/cm, and/or $100(P_1-P_2)/P_1$ is at least 25; and when condition (d) is applicable, $(P_1^c-P_2^c)/P_1^c$ is positive and the ratio of $(P_1-P_2)/P_1$ to $(P_1^c-P_2^c)/P_1^c$ is at least 1.2.

4. A PSA composition according to claim 1 wherein the polymeric pressure-sensitive adhesive component comprises a polyacrylate having a molecular weight of 500,000 to 2,000,000 and comprising 60 to 98% by weight of units derived from polymers of one or more alkyl or substituted alkyl acrylates or methacrylates, acrylamides or methacrylamides wherein the alkyl groups contain 2 to 12 carbon atoms, and 2 to 40% of units derived from methacrylic acid, acrylic acid, methacrylamide or acrylamide.

5. A PSA composition according to claim 1 wherein the additive has a heat of fusion of at least 20 Joules/g, and a first order transition point ($T_a$) of 30° to 60°.

6. A PSA composition according to claim 1 wherein the additive has a heat of fusion of at least 20 Joules/g and a first order transition point of 37° to 42°.

7. A PSA composition according to claim 1 wherein the additive is a crystalline polymer in which the crystallinity results from side chains which are attached to the polymer backbone.

8. A PSA composition according to claim 7 wherein the additive comprises a polymer of one or more monomers selected from substituted and unsubstituted acrylates, fluoroacrylates, vinyl esters, acrylamides, maleimides, α-olefins, p-alkyl styrenes, alkylvinyl ethers, alkylethylene oxides, triglycerides, alkyl phosphazenes and amino acids; a polyisocyanate; a polyurethane; or a polysiloxane.

9. A PSA composition according to claim 7 wherein the additive comprises repeating units of the general formula

where Y is an organic radical forming part of a polymer backbone and Cy comprises a crystallizable moiety comprising linear polymethylene moieties containing 12 to 20 carbon atoms.

10. A PSA composition according to claim 9 wherein the additive is a polyacrylate containing 50 to 98% of units derived from one or more straight chain alkyl acrylates, methacrylates, acrylamides or methacrylamides wherein the alkyl groups contain 12 to 20 carbon atoms, and 2 to 50% of units derived from one or more other monomers selected from other alkyl acrylates, methacrylates, acrylamides and methacrylamides; acrylic and methacrylic acids; acrylamide; methacrylamide; maleic anhydride; and comonomers containing amine groups.

11. A PSA composition according to claim 1 wherein the additive is a polymer comprising 60 to 100% of units derived from at least one monomer selected from the group consisting of alkyl acrylates, alkyl methacrylates, N-alkyl acrylamides, vinyl ethers, and vinyl esters containing 12 to 30, preferably 12 to 22 carbon atoms, 0 to 20% of units derived from at least one monomer selected from the group consisting of alkyl acrylates, alkyl methacrylates, N-alkyl acrylamides, vinyl ethers, and vinyl esters containing 4 to 12 carbon atoms, and 0 to 15% of units derived from at least one polar monomer selected from the group consisting of acrylic acid, methacrylic acid, itaconic acid, acrylamide, methacrylamide, acrylonitrile, methacrylonitrile, vinyl acetate and N vinyl pyrrolidone.

12. A PSA composition according to claim 1 wherein the additive has a weight average molecular weight of 3,500 to 25,000.

13. A PSA composition according to claim 4 wherein the additive has a weight average molecular weight of 500 to 4,000.

14. A PSA composition according to claim 1 wherein the polymeric pressure-sensitive adhesive component is present in amount 65 to 99%, and the additive is present in amount 1 to 35%.

15. A PSA composition according to claim 1 wherein the solubility parameter of the polymeric pressure-sensitive adhesive component ($\delta_1$) and the solubility parameter of the additive ($\delta_2$) are such that ($\delta_2-\delta_1$) is greater than or equal to $-0.5$ and less than or equal to 1.5.

16. A PSA composite which comprises
(A) a flexible backing, and
(B) adherent to the backing, a solvent-free layer of a pressure-sensitive adhesive composition which comprises
  (1) at least 50% by weight of a polymeric pressure-sensitive adhesive component, and
  (2) a crystalline polymeric additive having a weight average molecular weight of less than 25,000 and a first order transition temperature $T_a$ in the composition greater than 23° C.;
said PSA composite, when tested for peel strength under selected test conditions, (i) at a selected temperature $T_1$ which is less than $T_a$ and is from 20° C. to 60° C., having a PSA peel strength $P_1$, and
(ii) at a selected temperature $T_2$ which is higher than $T_a$ and is not greater than 100° C., having a PSA peel strength $P_2$;
a comparative PSA composite, which is the same as said composite except that the pressure-sensitive adhesive does not contain the additive, when tested for peel strength under the same test conditions,
  (i) at $T_1$, having a PSA peel strength $P_1^c$ or undergoing non-adhesive failure, and
  (ii) at $T_2$, having a PSA peel strength $P_2^c$ or undergoing non-adhesive failure;
and at least one of the following conditions being fulfilled
  (a) $P_1-P_2$ is at least 25 g/cm,
  (b) $100(P_1-P_2)/P_1$ is at least 25,
  (c) the comparative PSA composite undergoes non-adhesive failure at $T_1$ or $T_2$, and
  (d) $(P_1-P_2)/P_1$ is greater than $(P_1^c-P_2^c)/P_1^c$.

17. An assembly comprising a receptor and a PSA composite which is adherent to the receptor and which comprises
(A) a flexible backing, and
(B) between the backing and the receptor, a layer of a pressure-sensitive adhesive composition which comprises
  (1) at least 50% by weight of a polymeric pressure-sensitive adhesive component, and
  (2) a crystalline polymeric additive having a weight average molecular weight of less than 25,000 and a first order transition temperature $T_a$ in the composition greater than 23° C.;
said PSA composite, when tested for peel strength from said receptor under selected test conditions,
  (i) at a selected temperature $T_1$ which is less than $T_a$ and is from 20° C. to 60° C., having a PSA peel strength $P_1$, and
  (ii) at a selected temperature $T_2$ which is higher than $T_a$ and is not greater than 100° C., having a PSA peel strength $P_2$;
and at least one of the following conditions being fulfilled
  (a) $P_1-P_2$ is at least 25 g/cm, and
  (b) $100(P_1-P_2)/P_1$ is at least 25.

18. A process for removing a PSA composite from a receptor to which it is adhered, the PSA composite comprising
(A) a backing, and
(B) between and in contact with the backing and the receptor, a layer of a pressure-sensitive adhesive composition which comprises
  (1) at least 50% by weight of a polymeric pressure-sensitive adhesive component, and
  (2) a crystalline polymeric additive having a weight average molecular weight of less than 25,000 and a first order transition temperature $T_a$ in the composition greater than 23° C.,
and which has a PSA peel strength at a temperature $T_1$ which is less than $T_a$ and is from 20° C. to 60° C.;
which process comprises reducing the PSA peel strength of the PSA composite by heating the PSA composite from a temperature which is less than $T_a$ and is from 20° C. to 60° C. to a temperature which is higher than $T_a$ and is not greater than 100° C., and removing the PSA composite from the receptor while the PSA composite is at a temperature above $T_a$.

19. A PSA composite which comprises
(A) a flexible backing, and
(B) adherent to the backing, a solvent-free layer of a pressure-sensitive adhesive (PSA) composition which comprises
(1) at least 50% by weight of a polymeric pressure-sensitive adhesive component, and
(1) at least 50% by weight of a polymeric pressure-sensitive adhesive component, and
a crystalline polymeric additive having a weight average molecular weight of less than 25,000 and a first order transition point $T_a$ in the composition greater than 23° C.;
said PSA composite, when tested for peel strength by the method described in PSTC-1 using as the receptor a stainless steel plate as specified in Appendage B of PSTC-1 and after maintaining the assembly of the receptor and the PSA composite at a temperature of about 19° C. for about 240 minutes,
(i) at a selected temperature $T_1$ which is less than $T_a$ and is from 20° C. to 60° C., having a PSA peel strength $P_1$, and
(ii) at a selected temperature $T_2$ which is higher than $T_a$ and is not greater than 100° C., having a PSA peel strength $P_2$;
wherein $P_1-P_2$ is at least 25 g/cm, or $100(P_1-P_2)/P_1$ is at least 25, or both, and a comparative PSA composite which is the same as said composite except that the PSA composition does not contain the additive, when tested for peel strength under the same test conditions, having a PSA peel strength at $T_1$.

20. A PSA composite according to claim 19 wherein $P_1-P_2$ is at least 35 g/cm.

21. A PSA composite according to claim 19 wherein the polymeric pressure-sensitive adhesive component comprises a polyacrylate having a weight average molecular weight of 500,000 to 2,000,000 and comprising 60 to 98% by weight of units derived from polymers of one or more alkyl or substituted alkyl acrylates or methacrylates, acrylamides or methacrylamides wherein the alkyl groups contain 2 to 12 carbon atoms, and 2 to 40% of units derived from methacrylic acid, acrylic acid, methacrylamide or acrylamide.

22. A PSA composite according to claim 19 wherein the additive has a heat of fusion of at least 20 Joules/g, and a first order transition point $(T_a)$ of 30° to 60°.

23. A PSA composite according to claim 19 wherein the additive comprises repeating units of the general formula

where Y is an organic radical forming part of a polymer backbone and Cy comprises a crystallizable moiety.

24. A PSA composite according to claim 23 wherein the additive is a polyacrylate containing 50 to 98% of units derived from one or more straight chain alkyl acrylates, methacrylates, acrylamides or methacrylamides wherein the alkyl groups contain 12 to 20 carbon atoms, and 2 to 50% of units derived from one or more other monomers selected from other alkyl acrylates, methacrylates, acrylamides and methacrylamides; acrylic and methacrylic acids; acrylamide; methacrylamide; maleic anhydride; and comonomers containing amine groups.

25. A PSA composite according to claim 19 wherein the additive is a polymer comprising 60 to 100% of units derived from at least one monomer selected from the group consisting of alkyl acrylates, alkyl methacrylates, N-alkyl acrylamides, vinyl ethers, and vinyl esters containing 12 to 30, preferably 12 to 22 carbon atoms, 0 to 20% of units derived from at least one monomer selected from the group consisting of alkyl acrylates, alkyl methacrylates, N-alkyl acrylamides, vinyl ethers, and vinyl esters containing 4 to 12 carbon atoms, and 0 to 15% of units derived from at least one polar monomer selected from the group consisting of acrylic acid, methacrylic acid, itaconic acid, acrylamide, methacrylamide, acrylonitrile, methacrylonitrile, vinyl acetate and N-vinyl pyrrolidone.

26. A PSA composite according to claim 19 wherein the additive has a weight average molecular weight of 3,500 to 25,000 and is present in amount 1 to 35%.

27. A PSA composite which comprises
(A) a flexible backing; and
(B) adherent to the backing, a layer of a composition which is a pressure-sensitive adhesive at 20° C. and which comprises
(1) at least 65% by weight of a polymeric pressure-sensitive adhesive component which, on its own, is a pressure-sensitive adhesive at 20° C., and
(2) a crystalline polymeric additive which has a weight average molecular weight of less than 25,000 and a first order transition point $T_a$ in the composition of 25° to 100° C. and which comprises repeating units of the general formula

where Y is an organic radical forming part of a polymer backbone and Cy comprises a crystallizable moiety, the total weight of the Cy moieties being at least twice the weight of the remainder of the crystalline polymeric additive;
said PSA composite being a pressure-sensitive adhesive at $T_a$, but having a lower peel strength at $T_a$ than at 20° C.

28. A PSA composite according to claim 27 wherein the additive is a polyacrylate containing 50 to 98% of units derived from one or more straight chain alkyl acrylates, methacrylates, acrylamides or methacrylamides wherein the alkyl groups contain 12 to 20 carbon atoms, and 2 to 50% of units derived from one or more other monomers selected from other alkyl acrylates, methacrylates, acrylamides and methacrylamides; acrylic and methacrylic acids; acrylamide; methacrylamide; maleic anhydride; and comonomers containing amine groups.

29. A PSA composite according to claim 27 wherein the additive is a polymer comprising 60 to 100% of units derived from at least one monomer selected from the group consisting of alkyl acrylates, alkyl methacrylates, N-alkyl acrylamides, vinyl ethers, and vinyl esters containing 12 to 30 carbon atoms, 0 to 20% of units derived from at least one monomer selected from the group consisting of alkyl acrylates, alkyl methacrylates, N-alkyl acrylamides, vinyl ethers, and vinyl esters containing 4 to 12 carbon atoms, and 0 to 15% of units derived from at least one polar monomer selected from the group consisting of acrylic acid, methacrylic acid, itaconic acid, acrylamide, methacrylamide, acrylonitrile, methacrylonitrile, vinyl acetate and N-vinyl pyrrolidone.

30. A PSA composite according to claim 28 wherein the pressure-sensitive adhesive component is an acrylic adhesive.

31. A PSA composite according to claim 28 wherein $T_a$ is 37° C. to 45° C.

32. A PSA composite according to claim 28 wherein the pressure-sensitive adhesive component is a styrene/butadiene latex-based adhesive, or a thermoplastic rubber of the ABA block copolymer type, wherein A represents a thermoplastic polystyrene end block and B represents a rubber mid block of polyisoprene, polybutadiene or poly (ethylene/butylene).

33. A PSA composite according to claim 16 which contains at least 65% by weight of the polymeric pressure-sensitive adhesive component.

34. An assembly according to claim 17 which contains at least 65% by weight of the polymeric pressure-sensitive adhesive component.

35. A process according to claim 18 which contains at least 65% by weight of the polymeric pressure-sensitive adhesive component.

36. A PSA composite according to claim 27 which contains 65 to 99% of the polymeric pressure-sensitive adhesive component and 1 to 35% of the crystalline polymeric additive.

37. A PSA composite according to claim 27 which contains 65 to 95% of the polymeric pressure-sensitive adhesive component and 5 to 35% of the crystalline polymeric additive.

38. A PSA composite according to claim 27 which contains 70 to 90% of the polymeric pressure-sensitive adhesive component and 10 to 30% of the crystalline polymeric additive.

39. A pressure-sensitive adhesive composition which is a pressure-sensitive adhesive at at least one temperature in the range 20° to 40° C., and which comprises:
 (1) p% by weight, based on solids, of a polymeric pressure-sensitive adhesive component; and
 (2) q% by weight, based on solids, of a crystalline polymer additive which
  (a) has a heat of fusion of at least 20 Joules/g,
  (b) is intimately admixed with the polymeric pressure-sensitive adhesive component,
  (c) has a first order transition point $T_m$° C. when measured on its own,
  (d) has a first order transition point $T_a$° C. when measured in the composition, where $T_a$ is less than $T_m$, and
  (e) has a weight average molecular weight less than about 25,000 Daltons;
p being at least 50, and q being greater than 0 and less than 50 and such that said composition, when tested by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1
 (i) at a temperature $T_1$ which is between $(T_a-10)$° C. and $(T_a-4)$° C., having a PSA peel strength $P_1$ g/cm, and
 (ii) at a temperature $T_2$ which is between $(T_a+4)$° C. and $(T_a+10)$° C. having a PSA peel strength $P_2$ g/cm, where $100(P_1-P_2/P_1)$ is at least 50;

and said polymeric pressure-sensitive adhesive component, when tested on its own by said IMTI or ISPT procedure, being a pressure-sensitive adhesive at said temperature $T_1$.

40. A composition according to claim 39 wherein p is 50 to 90, and q is 10 to 50.

41. A composition according to claim 39 wherein p is at least 65 and q is less than 35.

42. A composition according to claim 39 wherein p is 70 to 80, and q is 20 to 30.

43. A composition according to claim 39 which comprises a solution of the polymeric pressure-sensitive adhesive component and the additive in an organic solvent.

44. A composition according to claim 39 which is in the form of a solvent-free layer adherent to a backing.

45. A composition according to claim 39 which, in the form of a solvent-free layer 1.6 to 1.8 mil thick and adherent to a backing which is a 1.5 mil thick film of polyethylene terephthalate (Mylar), has a tack value greater than about $10^{-2}$ cm$^{-2}$ at a temperature within the range $T_a$ to $(T_a-10)$° C.

46. A composition according to claim 39 which, in the form of a solvent-free layer 1.6 to 1.8 mil thick and adherent to a backing which is a 1.5 mil thick film of polyethylene terephthalate (Mylar), has a tack value greater than about $10^{-2}$ cm$^{-2}$ at room temperature.

47. A composition according to claim 39 which, in the form of a solvent-free layer 1.6 to 1.8 mil thick and adherent to a backing which is a 1.5 mil thick film of polyethylene terephthalate (Mylar), (a) has a tack value greater than about $10^{-2}$ cm$^{-2}$ at a temperature within the range 32° to 36° C. and (b) undergoes a substantial reduction in PSA peel strength when it is heated to 40° C.

48. A composition according to claim 39 wherein the polymeric pressure-sensitive adhesive component, when tested on its own by said ISPT procedure, is a pressure-sensitive adhesive at room temperature.

49. A composition according to claim 39 wherein the polymeric pressure-sensitive adhesive component, when tested on its own by said ISPT procedure, is a pressure-sensitive adhesive at 32° to 36° C.

50. A composition according to claim 39 wherein the weight average molecular weight of the additive is 3,500 to 25,000.

51. A composition according to claim 39 wherein the weight average molecular weight of the additive is 3,500 to 12,000.

52. A composition according to claim 39 wherein the polymeric pressure-sensitive adhesive component is selected from the group consisting of natural rubber adhesives; thermoplastic rubbers of the A-B-A block copolymer type, where A represents a thermoplastic polystyrene end block and B represents a rubber mid-block of polyisoprene, polybutadiene or poly(ethylene/butylene); butyl rubbers; polyisobutylenes; and polymers and copolymers of vinyl ethers.

53. A composition according to claim 39 wherein the additive is a crystalline polymer which contains side chains comprising crystallizable moieties.

54. A composition according to claim 53 wherein the weight of the crystallizable moieties is at least twice the weight of the remainder of the additive.

55. A composition according to claim 53 wherein the additive comprises repeating units derived from at least one monomer selected from acrylates, methacrylates, acrylamides and methacrylamides containing linear aliphatic groups containing 14 to 50 carbon atoms.

56. A composition according to claim 55 wherein the linear aliphatic groups contain 16 to 22 carbon atoms.

57. A composition according to claim 55 wherein the additive also comprises units derived from at least one monomer selected from acrylic acid and butyl acrylate.

58. A composition according to claim 55 wherein the additive consists essentially of 75 to 100% by weight of repeating units derived from at least one monomer selected from acrylates, methacrylates, acrylamides and methacrylamides containing linear alphatic groups containing 14 to 50 carbon atoms, and 0 to 25% by weight of repeating units derived from at least one monomer selected from acrylic acid and butyl acrylate.

59. A composition according to claim 39 wherein the additive has a first order transition point on its own, $T_m$, of 20° to 102° C.

60. A composition according to claim 58 wherein $T_m$ is 30° to 48°.

61. A composition according to claim 39 wherein the additive has a first order transition point in the composition, $T_a$, of 33° to 63°.

62. A composition according to claim 60 wherein $T_a$ is 33° to 40.5°.

63. A composition according to claim 39 wherein $T_m$-$T_a$ is 1 to 9° C.

64. A composition according to claim 39 wherein the additive is a crystalline polymer comprising a crystallizable main chain.

65. A composition according to claim 64 wherein the additive is a polymer of at least one monomer having the formula $CH_2=CHR$, where R is hydrogen or a linear or branched alkyl group containing 1 to 8 carbon atoms.

66. A composition according to claim 39 wherein the polymeric pressure-sensitive adhesive component has a glass transition point below about 10° C.

67. A composition according to claim 39 wherein the polymeric pressure-sensitive adhesive component is an acrylic adhesive.

68. A composition according to claim 39 wherein the polymeric pressure-sensitive adhesive component is a styrene-butadiene-rubber adhesive.

69. A PSA composite which comprises
 (A) a flexible backing, and
 (B) coated on the backing, a solvent-free layer of a pressure-sensitive adhesive composition which is a pressure-sensitive adhesive at at least one temperature in the range 20° to 40° C., and which comprises:
  (1) p% by weight of a polymeric pressure-sensitive adhesive component; and
  (2) q% by weight of a crystalline polymer additive which
   (a) has a heat of fusion of at least 20 Joules/g,
   (b) is intimately admixed with the polymeric pressure-sensitive adhesive component,
   (c) has a first order transition point $T_m°$ C. when measured on its own,
   (d) has a first order transition point $T_a°$ C. when measured in the composition, where $T_a$ is less than $T_m$, and
   (e) has a weight average molecular weight less than about 25,000 Daltons;
p being at least 50, and q being greater than 0 and less than 50 and such that said composite, when tested by an IMTI procedure using a test surface which is human skin, or by an ISPT procedure using a test surface which is stainless steel as specified in Appendage B of PSTC-1
 (i) at a temperature $T_1$ which is between $(T_a-10)°$ C. and $(T_a-4)°$ C., having a PSA peel strength $P_1$ g/cm, and
 (ii) at a temperature $T_2$ which is between $(T_a+4)°$ C. and $(T_a+10)°$ C. having a PSA peel strength $P_2$ g/cm, where $100(P_1-P_2/P_1)$ is at least 50;
and said polymeric pressure-sensitive adhesive component, when tested on its own by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1, being a pressure-sensitive adhesive at said temperature $T_1$.

70. A PSA composite according to claim 69 wherein p is at least 65 and q is less than 35.

71. A PSA composite according to claim 69 wherein the layer of adhesive is at least 0.5 mil thick.

72. A PSA composite according to claim 71 wherein the layer is less than 1.8 mils thick.

73. A PSA composite according to claim 69 wherein the layer of adhesive becomes clear when heated.

74. A PSA composite according to claim 69 which is a bandage, tape, wound closure, or wound dressing for use in the medical or surgical field.

75. A PSA composite according to claim 74 wherein the adhesive composition has a tack value greater than about $10^{-2}$ cm$^{-2}$ at room temperature and wherein the PSA composite, when tested by said IMTI procedure, has a PSA peel strength of at least 57 g/cm at 34° C. and a PSA peel strength of less than 7 g/cm at 42° C.

76. A PSA composite according to claim 69 which is a label.

77. A process for affixing a flexible backing to a receptor, which process comprises
 (A) interposing between said flexible backing and said receptor a solvent-free pressure-sensitive adhesive composition which is a pressure-sensitive adhesive at at least one temperature in the range 20° to 40° C., and which comprises:
  (1) p% by weight of a polymeric pressure-sensitive adhesive component; and
  (2) q% by weight of a crystalline polymer additive which
   (a) has a heat of fusion of at least 20 Joules/g,
   (b) is intimately admixed with the polymeric pressure-sensitive adhesive component,
   (c) has a first order transition point $T_m°$ C. when measured on its own,
   (d) has a first order transition point $T_a°$ C. when measured in the composition, where $T_a$ is less than $T_m$, and
   (e) has a weight average molecular weight of less than about 25,000 Daltons;
p being at least 50, and q being greater than 0 and less than 50 and such that said composition, when the receptor is human skin, when tested by an IMTI procedure using said flexible backing and a test surface which is human skin, and, when the receptor is any other surface, when tested by an ISPT procedure using said flexible backing and a test surface which is said receptor (i) at a temperature $T_1$ which is between $(T_a-10)°$ C. and $(T_a-4)°$ C., having a PSA peel strength $P_1$ g/cm, and (ii) at a temperature $T_2$ which is between $(T_a+4)°$ C. and $(T_a+10)°$ C. having a PSA peel strength $P_2$ g/cm, where $100(P_1-P_2/P_1)$ is at least 50;

and said polymeric pressure-sensitive adhesive component, when tested on its own by said IMTI or ISPT procedure, being a pressure-sensitive adhesive at said temperature $T_1$; and (B) pressing the backing against the receptor, with the pressure-sensitive adhesive composition between them, while the adhesive composition is at a temperature which is below $T_a$ and at which the composition is tacky.

78. A process according to claim 77 wherein p is at least 65 and q is less than 35.

79. A process according to claim 77 wherein the pressure-sensitive adhesive composition is in the form of a layer on the backing before step (A).

80. A process according to claim 79 wherein the receptor is substantially non-porous.

81. A process according to claim 79 wherein the receptor is substantially porous.

82. A process according to claim 77 wherein the pressure-sensitive adhesive composition has been cross-linked before step (A).

83. A process according to claim 77 wherein the pressure-sensitive adhesive composition is not tacky at room temperature and is heated to a temperature at which it is tacky during at least part of step (B).

84. An assembly which comprises a receptor and PSA composite which is adherent to the receptor and which comprises (A) a flexible backing; and (B) coated on the backing, a solvent-free layer of a pressure-sensitive adhesive composition which is a pressure-sensitive adhesive at at least one temperature in the range 20° to 40° C., and which is adherent to the receptor and which comprises (1) p% by weight of a polymeric pressure-sensitive adhesive component, and (2) q% by weight of a crystalline polymer additive which (a) has a heat of fusion of at least 20 Joules/g, (b) is intimately admixed with the polymeric pressure-sensitive adhesive component, (c) has a first order transition point $T_m°$ C. when measured on its own, (d) has a first order transition point $T_a°$ C. when measured in the composition, where $T_a$ is less than $T_m$, and (e) has a weight average molecular weight less than about 25,000 Daltons;

p being at least 50, and q being greater than 0 and less than 50 and such that said PSA composite, when peeled away from the receptor at an angle of about 180° and at a rate of about 12 inch/minute (i) at a temperature $T_1$ which is between $(T_a-10)°$ C. and $(T_a-4)°$ C., having a PSA peel strength $P_1$ g/cm, and (ii) at a temperature $T_2$ which is between $(T_a+4)°$ C. and $(T_a+10)°$ C. having a PSA peel strength $P_2$ g/cm, where $100(P_1-P_2/P_1)$ is at least 50;

and said polymeric pressure-sensitive adhesive component, when tested on its own by an IMTI procedure using a backing which is a 1.75 mil thick film of a polyester thermoplastic elastomer (Hytrel 4056) and a test surface which is human skin, or by an ISPT procedure using a backing which is a 1.5 mil thick film of polyethylene terephthalate (Mylar) and a test surface which is stainless steel as specified in Appendage B of PSTC-1, being a pressure-sensitive adhesive at said temperature $T_1$.

85. An assembly according to claim 84 wherein the receptor is human skin.

86. An assembly according to claim 84 wherein the receptor is a glass container.

87. An assembly according to claim 84 wherein the receptor is a merchandizable product and the backing is a label carrying a price code or a bar code for that product.

88. A process for removing a PSA composite from a receptor to which it is adhered, the PSA composite comprising (A) a flexible backing; and (B) coated on the backing, a solvent-free layer of a pressure-sensitive adhesive composition which is a pressure-sensitive adhesive at at least one temperature in the range 20° to 40° C., and which is adherent to the receptor and which comprises (1) p% by weight of a polymeric pressure-sensitive adhesive component, and (2) q% by weight of a crystalline polymer additive which (a) has a heat of fusion of at least 20 Joules/g, (b) is intimately admixed with the polymeric pressure-sensitive adhesive component, (c) has a first order transition point $T_m°$ C. when measured on its own, (d) has a first order transition point $T_a°$ C. when measured in the composition, where $T_a$ is less than $T_m$, and (e) has a weight average molecular weight less than about 25,000 Daltons;

p being at least 50, and q being greater than 0 and less than 50; which process comprises heating the PSA composite from a temperature below $T_a$ to a temperature above $T_a$, thereby reducing its PSA peel strength, and removing the PSA composite from the receptor while the PSA composite is at a temperature above $T_a$.

89. A process according to claim 88 wherein p is 50 to 90, and q is 10 to 50.

90. A process according to claim 89 wherein p is at least 65 and q is less than 35.

91. A process according to claim 88 wherein p is 65 to 85, and q is 15 to 35.

92. A process according to claim 89 wherein p is 70 to 80, and q is 20 to 30.

93. A process according to claim 89 wherein the PSA composite is heated to a temperature of at least about 40° C.

94. A process according to claim 91 wherein the receptor is human skin and the PSA composite is heated to a temperature of about 40° C. in step (A).

95. A process according to claim 89 wherein the PSA composite has a PSA peel strength $P_1$ g/cm at a temperature below $T_a$ and a PSA peel strength $P_2$ g/cm at the temperature of the PSA composite while it is being removed, and $100(P_1-P_2)P_1$ is at least 50.

96. A process according to claim 95 wherein the PSA composite has a PSA peel strength $P_1$ at room temperature.

97. A process according to claim 95 wherein the PSA composite has a PSA peel strength $P_1$ at 32° C.

98. A process according to claim 95 wherein the PSA composite has a PSA peel strength $P_1$ at 36° C.

* * * * *